Jan. 30, 1934. J. H. ROBERTS 1,945,469
FABRICATING MACHINE FOR LONG STOCK
Original Filed May 3, 1928 7 Sheets-Sheet 1
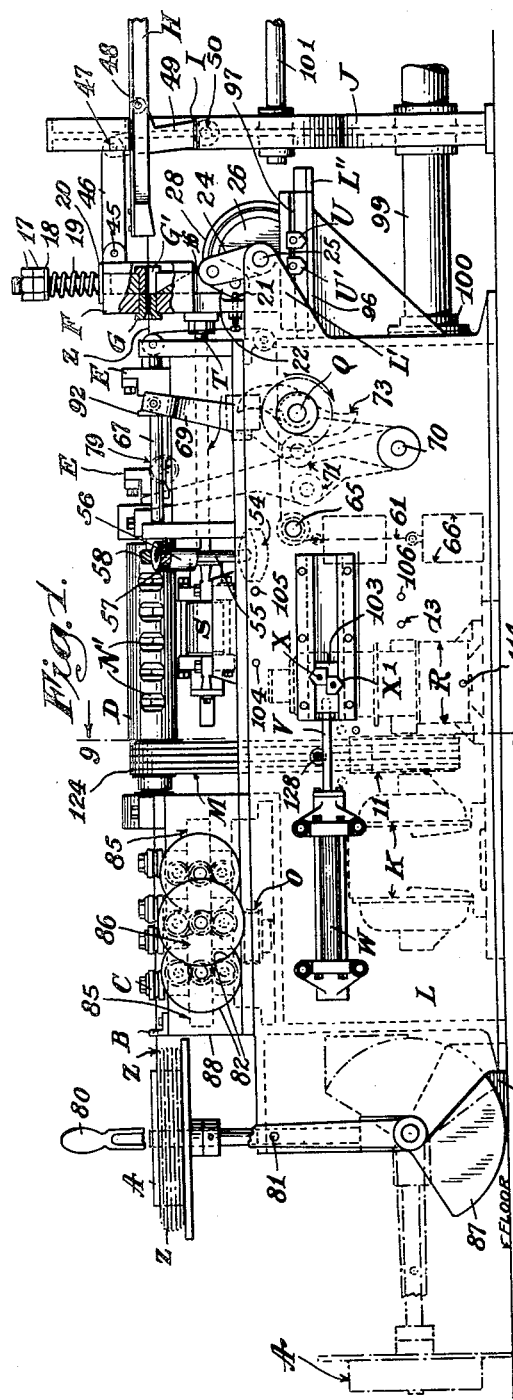
Inventor
Joseph H. Roberts
By his Attorney
Philip Farnsworth Jan. 30, 1934.  J. H. ROBERTS  1,945,469
FABRICATING MACHINE FOR LONG STOCK
Original Filed May 3, 1928  7 Sheets-Sheet 2
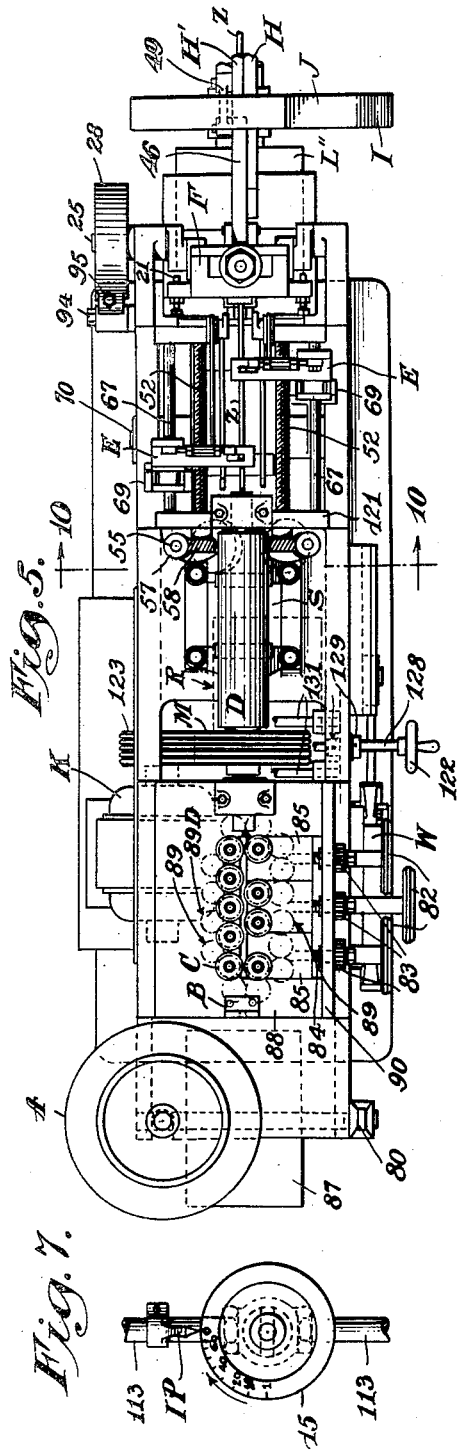
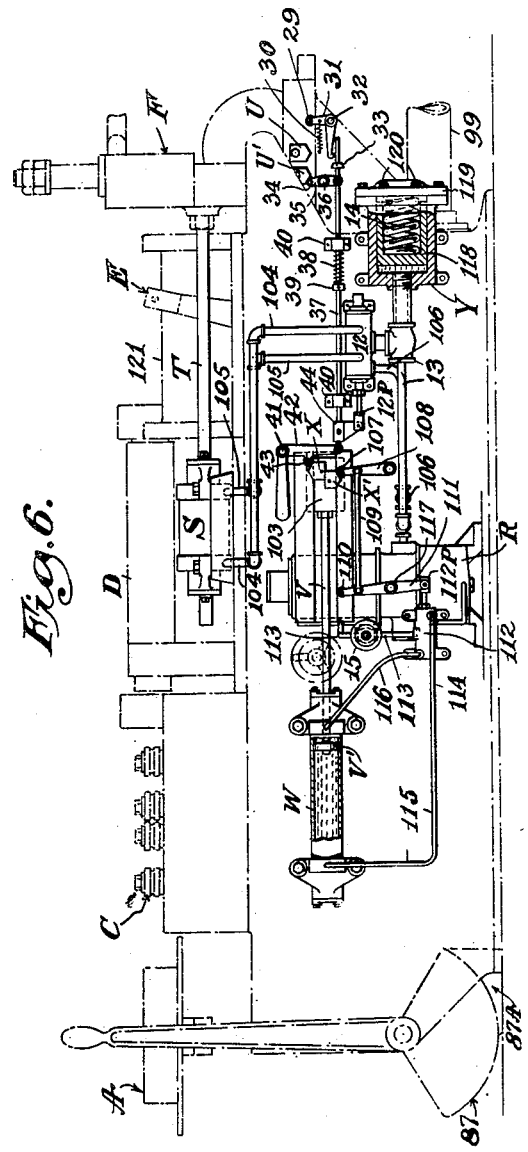
Inventor:
Joseph H. Roberts
By his Attorney
Philip Farnsworth

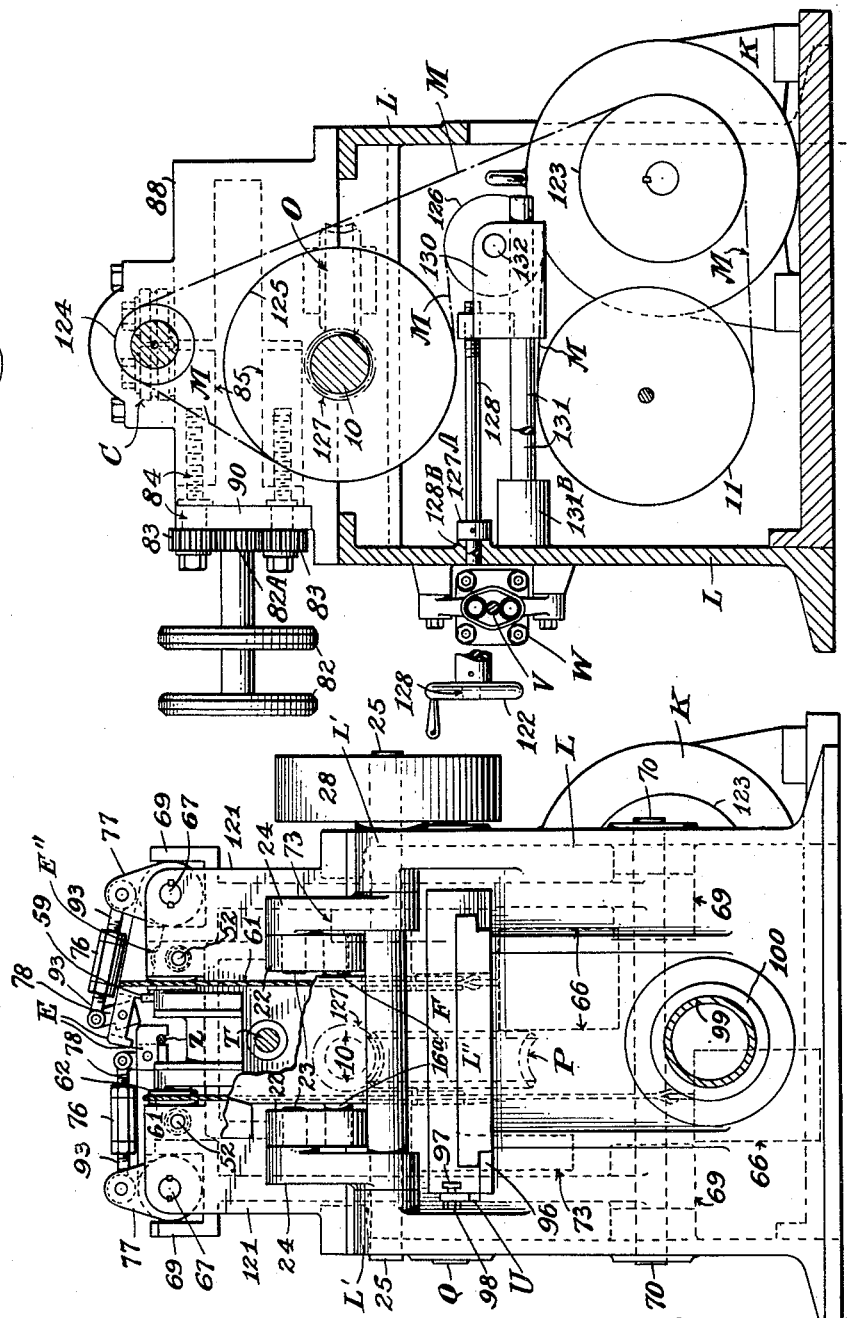

Jan. 30, 1934.  J. H. ROBERTS  1,945,469
FABRICATING MACHINE FOR LONG STOCK
Original Filed May 3, 1928   7 Sheets-Sheet 4
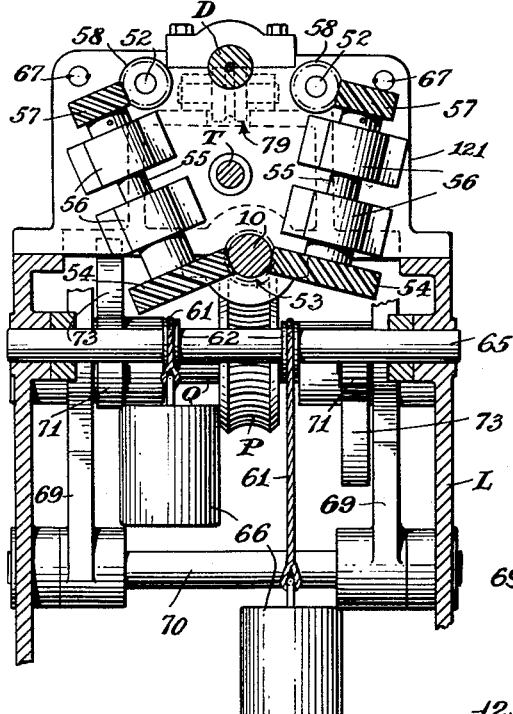
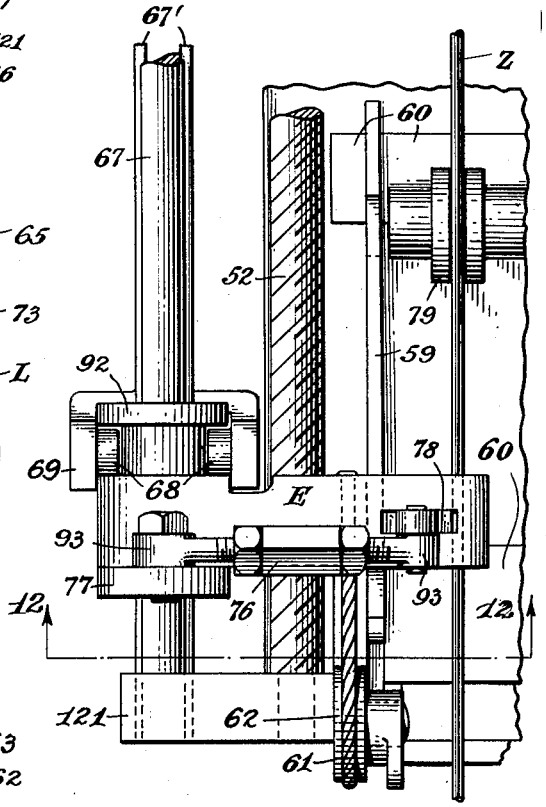
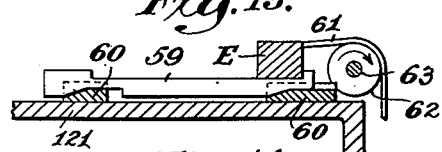
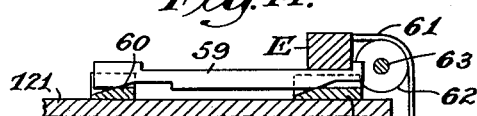
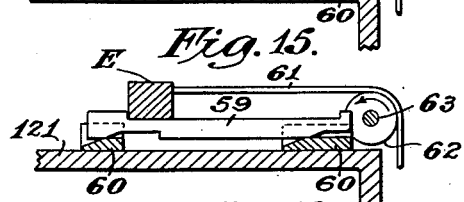
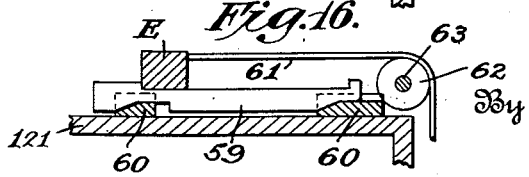
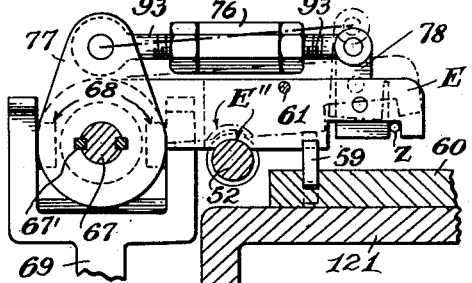
Inventor:
Joseph H. Roberts
By his Attorney
Philip Farnsworth

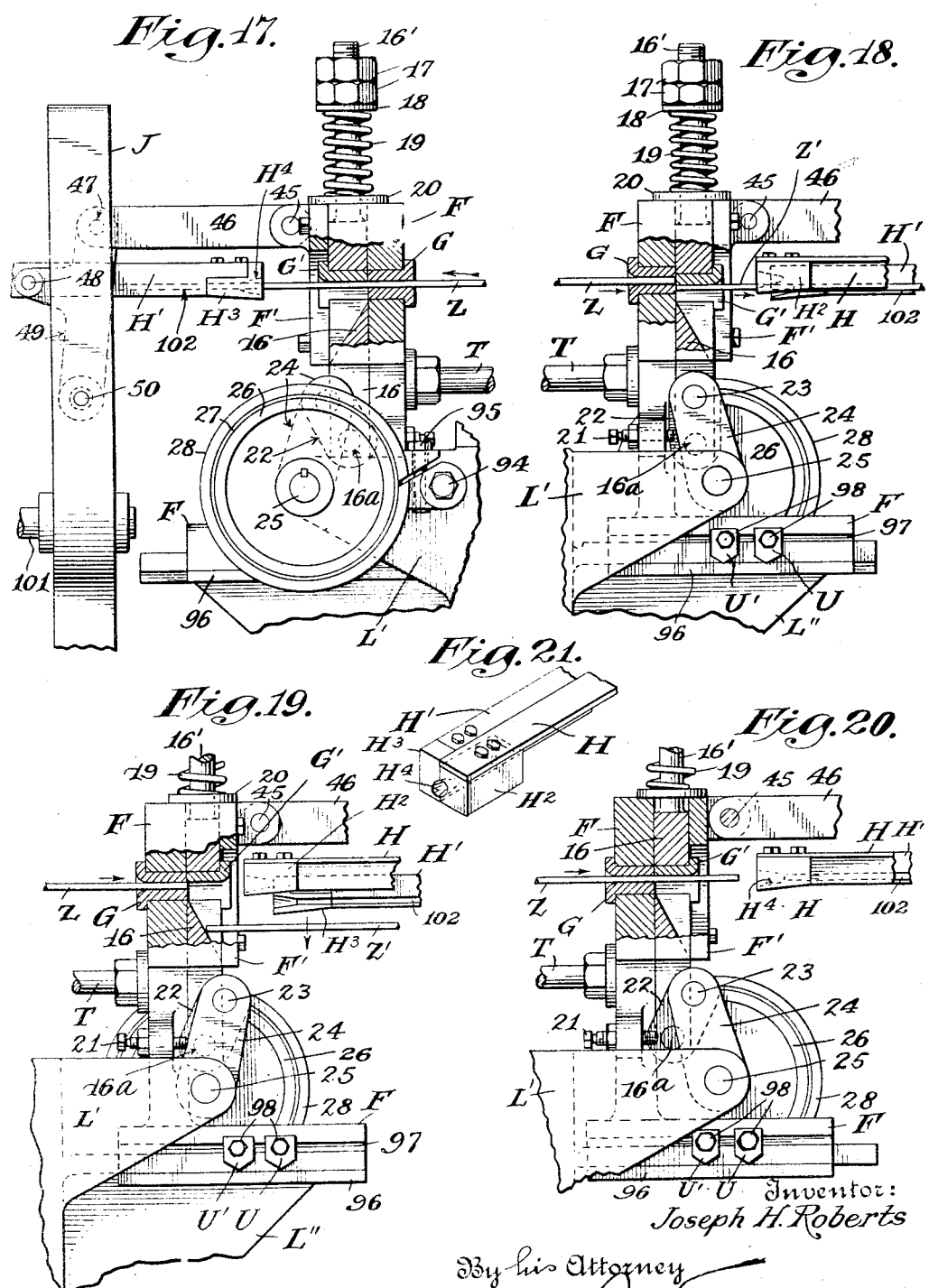

Jan. 30, 1934.   J. H. ROBERTS   1,945,469
FABRICATING MACHINE FOR LONG STOCK
Original Filed May 3, 1928   7 Sheets-Sheet 6
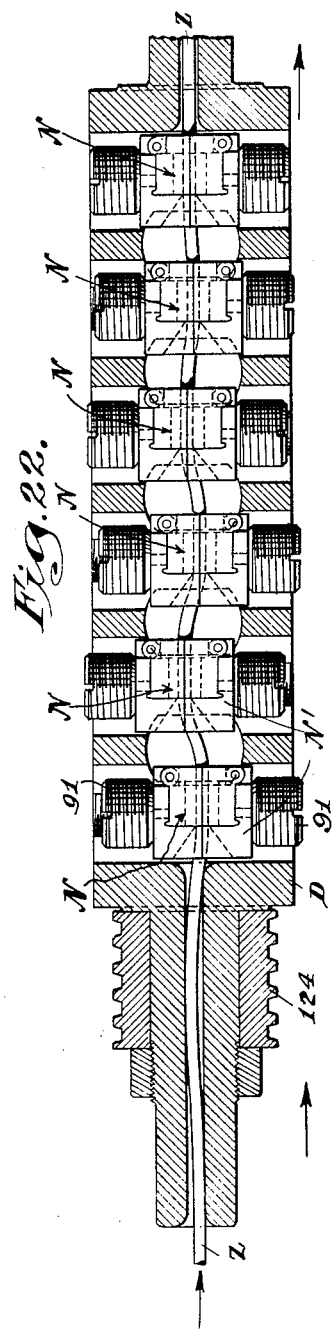
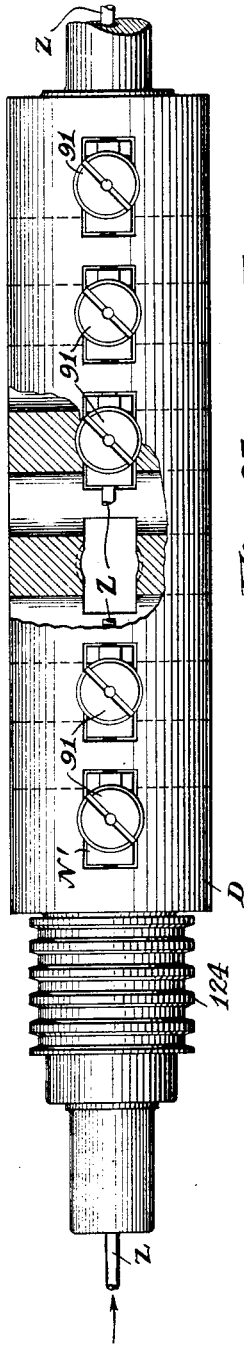
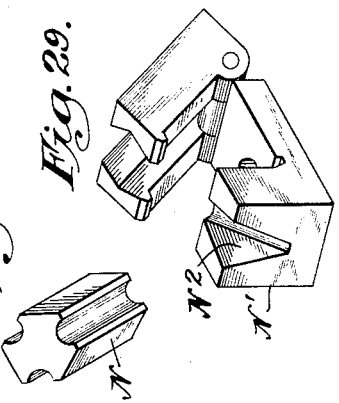
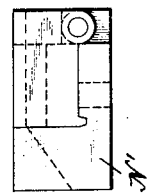
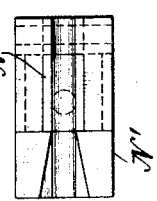
Inventor:
Joseph H. Roberts
By his Attorney
Philip Farnsworth

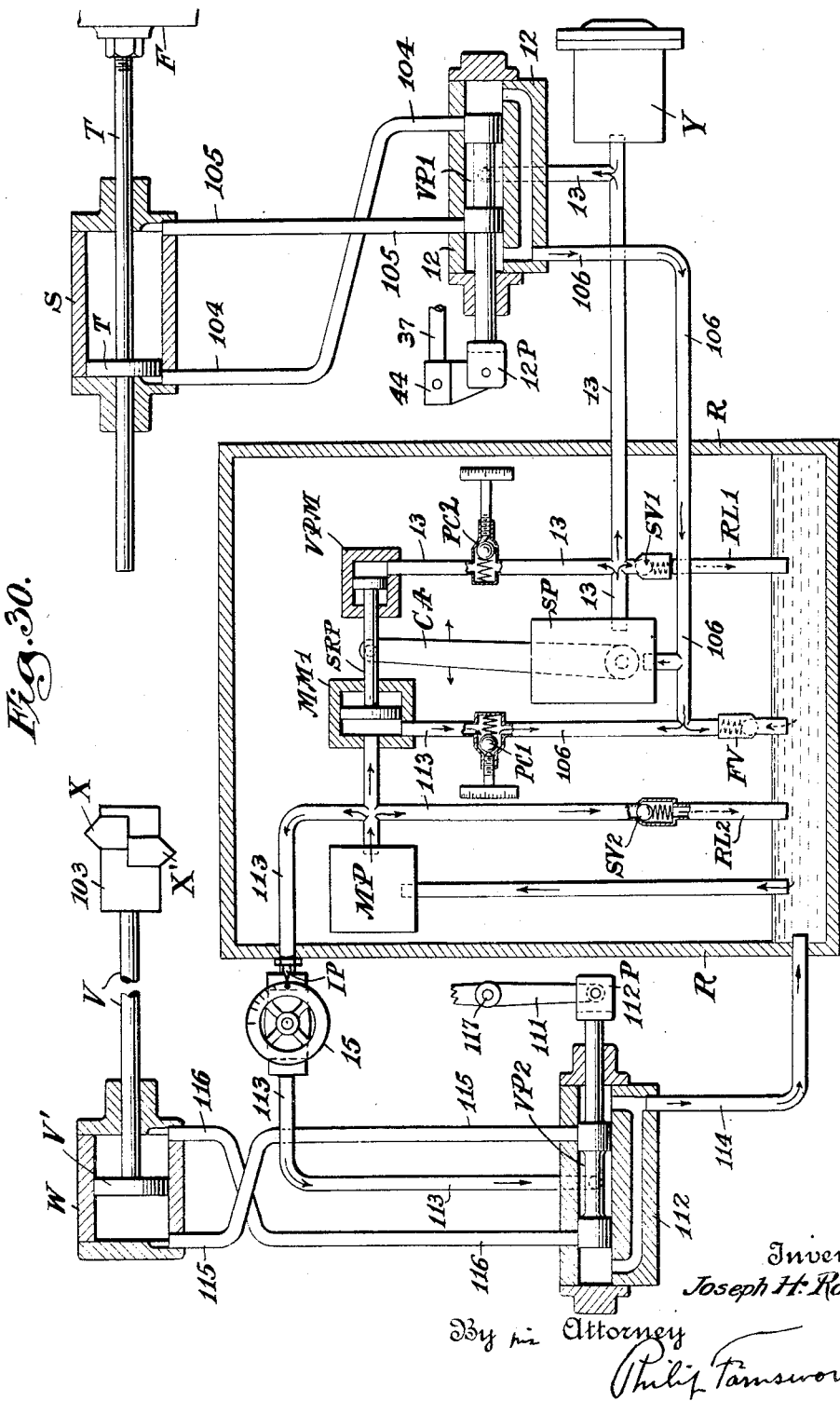

Patented Jan. 30, 1934

1,945,469

UNITED STATES PATENT OFFICE 1,945,469

FABRICATING MACHINE FOR LONG STOCK

Joseph H. Roberts, Waterbury, Conn., assignor to F. B. Shuster Co., Inc., New Haven, Conn., a corporation Application May 3, 1928, Serial No. 274,750
Renewed August 24, 1932

92 Claims. (Cl. 140—140)

This invention relates to machines of the type wherein long stock, such as wires, rods or sheets, (more particularly of steel or other metal, in lengths of hundreds of feet as they come from the mill), is fed continuously to a fabricating device which acts on uniformly spaced portions of the length of the stock, the fabricating device for that purpose being a reciprocating or "flying" element which during its fabricating operation moves in synchronism with the stock but has only a very short stroke as compared with the spaces between fabricated portions of the length of the stock and spends most of its time at rest while enough of the stock continues to be fed to warrant the next excursion and action of the fabricating device to permit uniform spacing between fabricated portions of the length of the stock. Such a machine in theory will increase production per day to the extent of several thousands of feet of stock, as compared with machines lacking said "flying" element, but if attempts be made to construct such machine utilizing ordinary mechanism such as gearing and clutch and the like the result is a costly complicated and cumbrous apparatus, and if attempts be made to design a machine for the same purpose and of simpler construction and wherein the "flying" element is operated by a compressible fluid such as air or other gases, the result is that the very fact of compressibility of the driving fluid makes the machine impracticable in respect of the desired object of obtaining uniform spacing between the fabricated portions of the stock, such for example as shearing operations for cutting the long stock into shorter lengths of uniform linear dimensions for convenient transportation and delivery to factories where they are finally fabricated.

The object of the invention is to improve and simplify the construction and operation and reduce the cost of machines of the above general type, and the invention consists of the various features as hereinafter described in detail, the broad novelty of which is pointed out in the claims.

The object of the invention more particularly is to provide a practical machine of low cost for the purpose of first straightening or leveling the long stock and then shearing it by the "flying" element into the shorter sub-lengths. But various features of the invention are useful whether the fabricating operation by the "flying" element be a shearing operation or something else such for example as a punching operation.

Among the various new and valuable features of the invention which are pointed out in the claims are the hydraulic means for driving the fabricating mechanism, the means intermittently initiating the operation of said driving means, and the coordination of the driving means and the initiating means with the rate of operation of the stock-feeding means or the actual feed of the stock. By such coordination, the intermittent operations of the movable fabricating means are conducted at times which are definitely related to the rate of stock-feed; and while the stock preferably is fed at maximum operative (i. e., optimum) rate, yet such coordination prevents irregular spacing of fabricated portions of the stock during accelerating of the machine as a whole upon starting. The invention includes various of the methods disclosed for handling and treating the stock.

Of the drawings,

Figs. 1–6 show the machine as a whole, Figs. 1–2 showing the front elevation (Fig. 2 being a continuation from the right of Fig. 1), the stock Z moving from left to right to the receiving and delivery apparatus of Fig. 2; Fig. 3 being an end elevation of the latter and Fig. 4 a detail thereof; Fig. 5 being a plan of Fig. 1; and Fig. 6 being a front elevation similar to Fig. 1 but more clearly showing the hydraulic apparatus for operating the fabricating device F or shear;

Fig. 7 is a detail of the dial 15 of the adjustment for the operation of the master piston V' in master cylinder W of Fig. 6, the dial being calibrated in accord with the length of stock fed between fabricating operations of the device therefor;

Fig. 8 is a general end elevation of the main machine viewed from the right or delivery end of Fig. 1, for clearness omitting the fabricating device or shear F shown fully in Figs. 17–20 in various phases of its cycle of operations;

Fig. 9 is a transverse section of the main machine at 9—9 of the front elevation of Fig. 1, i. e., between C and D which are respectively the preliminary feeding and straightening rolls (C) and the final straightening or rotary flier (D);

Fig. 10 is a transverse section of the main machine at 10—10 of the plan of Fig. 5;

Fig. 11 is an enlarged plan showing one of the devices E for gripping and pulling the stock, said devices being located between flier D and shear F, Figs. 1 and 5; Fig. 12 being an end view of a device E; and Figs. 13–16 illustrating (somewhat diagrammatically) the tripping means for said pulling devices E;

Figs. 17–20 show (by enlarged elevations in part section) the various stages of the cycle of operations of the horizontally reciprocable fabricating device or shear F, Fig. 17 being a rear elevation (stock Z shown as fed from right to left), and Figs. 18-20 being front elevations (stock moving left to right) illustrating successive positions of the parts during the progress of the reciprocation of device F;

Fig. 21 is a perspective detail of the funnel end H4 of the stock-receiving apparatus of Fig. 3 and of Figs. 18-20, right;

Figs. 22-23 are a section and elevation of rotary flier D of Figs. 1 and 5, showing the assembly of dies N and their holders N';

Figs. 24-29 are details showing the construction of each of the plurality of straightening dies N and their holders N' in rotary flier D;

and Fig. 30 is a diagram of the hydraulic circuits which operate the fabricating mechanism.

*General description of the machine shown.*—
The long stock Z to be fabricated is put in place at the left end of the machine (Fig. 1) in the form of a coil of mill length sometimes hundreds of feet long on reel A; and the stock leaves the machine at the right (Fig. 3) in the form of a plurality of fabricated shorter pieces Z' of uniform lengths which have been delivered to the receiving apparatus of Fig. 3 after the last fabricating operation such as shearing by F. Fig. 1 shows (and Fig. 6 more simply) the reel A supporting the long stock such as wire, rod or sheet Z in the unstraightened condition as delivered from the mill, and wound in a coil. C indicates means for feeding the stock into the machine and preliminarily straightening it. Rotary flier D is a final straightening means (for wires or rods). Alternately-acting pullers E at right of D grip and pull the stock to the right continuously thru flier D and act as feeding means ancillary to C, delivering the straightened stock from flier D to and thru F which is a horizontally reciprocable fabricating device here shown as a shear carrying two dies (Figs. 1 and 17), both horizontally reciprocable, i. e., a vertically fixed die G and a vertically reciprocable die G', the latter operated downwardly by the forward stroke (to right) of intermittently reciprocable device F which moves both dies horizontally.

All the above elements are driven directly or indirectly, by the constant-speed electric motor K, i. e., the rolls C, flier D, pullers E and shear F.

The fabricating mechanism F is operated directly by the hydraulic system shown in Figs. 6 and 30.

Rolls C, flier D (not used in a machine designed for sheet-straightening or leveling) and pullers E are driven preferably by solid (not liquid) power connections from motor K. Such connections preferably effect continuous feed of stock Z at uniform rate at all times (save in starting and stopping the machine as a whole) from reel A to the fabricated-stock-receiving means at the right.

Fabricating device F is reciprocated intermittently (thruout the continuous feeding of stock Z) by power connections from constant-speed motor K, which connections include connections by a liquid (preferably oil) as a substantially incompressible fluid as distinguished from gases, the oil being put under operating pressure by pumping apparatus in casing R and causing operation of motor S and its piston T to effect the intermittent reciprocation of device F, the frequency of which is determined by the cycle-frequency of motor W in the example shown.

The oil-pressure system here preferably includes pipe connections from casing R which operate oil-motor W to determine and control the frequency of the excursion cycle of device F, and to initiate such excursions after periods of rest of F, the actual work of the reciprocation of F being effected by oil-motor S.

Therefore motor S is termed herein the slave-motor, and motor W is termed the master-motor.

Since common-driver K operates both master-motor W (via oil-pumping apparatus in R) and also the stock-feeding devices (C and E via the solid driving-connections) coordination is caused and exists between the rate of feed of stock Z and the cycle-frequency of the reciprocating fabricating device F and the rates of movement of tools G and G' carried by it.

Driver K and casing R for the oil-pump system are mounted under the main body of the machine (Fig. 1) beneath rolls C and flier D, and therefore occupy no floor space not occupied by the entire machine as a whole.

Fig. 9 shows this distribution of power from driver K to the shafts which operate rolls C, flier D and the oil-pumps in casing R. The primary transmission is by M (a multi-strand belt or link-belt chain) extending from pulley 123 of motor K up to sheave 124 (operating flier D), thence down to sheave 125 (operating rolls C, etc.), thence to right to sheave 126 (bodily movable to permit tensioning the belt M), thence to left to sheave 11 (driving the oil-pumps in casing R, Fig. 6, for the hydraulic system which reciprocates F), and thence back to motor K.

Rolls C (Figs. 1 and 6) are driven by jackshaft 10 (Fig. 9) via the worm 127 on said shaft and worm-gear O therefor (Figs. 1 and 9).

Flier D (Figs. 1 and 6) is driven directly by sheave 124 (Figs. 9 and 1).

The proper operating tension on belt M (Fig. 1) is maintained (Figs. 9 and 5) by way of hand-wheel 122 operating screw 128 (Fig. 9) journaled at 128B in bed-casting L. Screw 128 operates in support 130 of sheave 126 to slide said support on rods 131 fixed at 131B in bed L. Collars 129 absorb the end-thrust forces on screw 128. Sheave 126 idles on dead shaft 132 fixed in sliding support 130.

Alternately-acting stock-pullers E (Figs. 1 and 6) are operated from worm 127 (on jack-shaft 10 Figs. 9 and 8) via worm-gear P which operates quick-return cam-shaft Q (Figs. 1, 8 and 10).

Shear head F (Figs. 1 and 6) is operated by slave piston T which is reciprocated by the hydraulic system operated by the oil-pumps in casing R (Figs. 6 and 30) which pumps in turn are operated by sheave 11 (Fig. 9).

The hydraulic system operated by motor K preferably also operates master piston V' in motor cylinder W (Fig. 6).

Thus motor K operates all the machine parts, both those operated by hydraulic connections (including slave-motor S and master motor W) and those operated by solid connections (including the stock-feeding means); and the continuously fed stock Z, first passing between the two rows of positively rotated rolls C having solid driving connections to motor K, next passes thru a series of staggered straightening dies N in rotary flier D which also has solid driving connections to motor K; the stock finally passing to and thru shear F which is solidly connected to slave piston T which has hydraulic connection with a standard type of oil-pump in casing R (Fig. 6), this oil-pump having solid connections with motor K. And master motor W (operated by another standard type oil-pump in casing R) has hydraulic and solid driving connections to motor K; altho in the case disclosed the two oil-pumps in casing R (i. e., the one for slave motor S and the one for master-motor W) both are driven via sheave 11 which in turn is operated by main driver K.

The various manual mechanical adjustments all are located within range of easy access by the operator at the left front of the machine (Figs. 1 and 5) i. e., the reel-operating handle 80, the hand-wheels 83 for adjustment of rolls C, the hand-wheel 122 for tensioning the belt M, the screw adjustments 91 for the dies in flier D; the calibrated throttle or choke-valve 15 for the master cylinder W (Figs. 6 and 7); and the manually and automatically operable bell-crank 41—42 for initiating the intermittent excursions of shear F, said crank usually being operated automatically, as by master-motor W at regularly recurring times, the frequency of which is determined by the adjustment of the calibrated choke-valve 15. This valve is calibrated in terms of spacing (as in feet) between fabricated portions of stock (such as lengths of cut stock in the sample machine disclosed).

Altho there are various operator's adjustments as above, yet there is only one for variation of the lengths of the cut stock, i. e., choke-valve or throttle 15.

Here all that is necessary to be done to adjust the machine to cut the long stock into pieces of the uniform length desired is to turn choke-valve 15 to the dial indication of the length in feet desired for the cut lengths, and then start the machine by closing the switch of electric motor K. Then the end of the roll of stock is placed manually in the first vertical pair of feed-rolls C which being in motion grip it. While the motor K is preferably a constant-speed motor, yet in any case the machine will produce stock in uniform lengths, quite independently of the rate of stock-feed (as when the motor is accelerating to or decelerating from normal full speed) on account of the coordination in the present invention between each of master-motor W and the consequent cycle-frequency of fabricator F, the rate of reciprocatory movement of F, and the coordinated rate of feed of the stock.

The intermittent excursions of F, short in distance and time, preferably and normally are spacially uniform independently of the rate of feed of the stock, in that the forward stroke of F always is the same length (for all lengths of cut stock) and the return stroke always brings F to the same point of rest which is its normal position because it spends most of its time there, i. e., during the feed of most of the stock. Even altho the rate of movement of F at portions of its excursion varies, the time interval between the start of the excursion and the completion of the cycle of the vertically movable die G' always is constant and coordinated with the feeding means or fed stock; and the position of rest of F is the same for all adjustments of throttle 15; so that it is the period of rest of F which determines the length of stock which is fed during the time interval between successive operations on the stock.

Shear head F is slidably mounted on the ways-member L which is a lower extension of bed-casting L (Figs. 1 and 5). Retaining gibs 96 (Fig. 8) are suitably attached to the underside of shear head F; and they overlap the bottom of member L" in a manner to substantially maintain F in sliding relationship to member L".

The means for reciprocating F is the slave piston T of slave motor S (Figs. 1 and clearest in Fig. 6) driven by the hydraulic means including one of the oil-pumps in casing R (Fig. 6), and including pipe 13, valve 12, pipes 104—105 which respectively serve alternately to supply high-pressure oil to slave motor S from valve 12 and to return low-pressure oil to said valve from said motor, and pipe 106 which returns low-pressure oil from valve 12 to the oil-pump in casing P.

F has a stroke of only a few inches usually, altho the lengths into which the long stock Z is cut by it, (i. e., the spaces between the portions of the long stock which it fabricates) may be very much longer, as twenty feet or more, altho ordinarily from three to twelve feet. The object in reciprocating F is to prevent limitation of production by stopping the feed of the stock to permit successive fabricating operations on stationary stock. Since F here operates on the moving stock, F is moved at substantially the same rate as the stock at the instant of fabricating operation on the stock, i. e., while tool G' is acting on it. For economy, the forward or operating stroke of F (to right, Fig. 1) is no longer than is necessary to execute the fabricating operation, which usually is done in only a small fraction of the time taken for the feed of a single fabricated sub-length of stock. The feed of the stock is continuous to and/or thru F, and if not at an absolutely uniform rate, at least at a rate which preferably is uniform relative to the tool-operation an average rate so high as not to waste time as heretofore by stopping the feed during fabrication. F has ample time, after completion of its forward or fabricating stroke, to return to its position of rest while the uncut remainder of the long stock continues to be fed thru it to advance the next length of stock to the distance desired for the next fabricating operation, and therefore the return stroke of F may be at a rate much slower than its forward stroke; but it is simpler and preferable to return it by the arrangement shown at the same general rate and then give it a period of rest which is long as compared with the time needed to feed enough stock for the next fabrication, and that is done here. The rate of travel of F from its position of rest to its fabricating position always is the same in a given machine relative to the rate of stock-feed. The rate of feed is kept constant by the apparatus disclosed including constant-speed electric motor K; and the machine preferably is set in operation at optimum stock-feed, before the van of the stock is inserted between the first pair of feed-rolls C.

Thus the reciprocation of F is irregular, consisting of quick excursions and intervening long pauses in its normal uniform position of rest at the left, Fig. 1. During each pause, most of the footage of the length of the stock to be fabricated is being fed, the small remainder of each short length being fed during the brief excursion of F. The relatively extremely short excursion of F is indicated in Fig. 1, right, i. e., a portion of the distance between the right of the pullers E and the left of the receiving support H for the sub-length of stock, and is indicated even more clearly by the short length of cylinder S, Figs. 1 and 6.

The combination of the hydraulic system of Figs. 6 and 30 for effecting such intermittent brief excursions of fabricator F in a timely manner resulting in accurate uniform spacing between successive fabricated portions of the stock is especially advantageous for the reason that the operating pressures are applied and withdrawn more quickly than by mechanical clutches and such hydraulic pressures operate accurately as to time as distinguished from operation by compressed air or the like, i. e., compressible fluids.

Figs. 17–20 show the various stages of the cycle of operations of the horizontally reciprocating fabricating device or shear head F, Fig. 17 being a rear view (stock Z here moving from right to left) the reciprocating device F being here in its zero or normal position of rest at right and stock Z being fed thru two alined dies, i. e., vertically stationary die G and vertically reciprocable die G'; Figs. 18–20 being front elevations, and Fig. 18 showing reciprocating device F as a whole (with both dies G, G') as having been moved to the right (Figs. 1 and 5) one-half of the forward stroke of its excursion, vertically movable die G' having been forced down at said mid-stroke point (by means of the forward movement of F via linkage 22, 24) and the two dies having cooperated to shear off an advanced end length Z' of stock Z (broken away at right beyond slot 102 to indicate its length of a number of feet further to the right); Fig. 19 showing the cut sub-length Z' of stock (shown broken away at right) dropping down to the receiving apparatus of Figs. 2–4, shear F as a whole having been moved nearly to the right-hand limit of its forward stroke, and movable die G' having been moved up to be again (as in Fig. 17) in horizontal alinement with vertically fixed die G in readiness for continued feed of uncut stock Z thru and rightwardly of the dies G and G' during the back stroke of reciprocating shear F as a whole leftwardly (Figs. 18–20) toward its normal zero position of rest (at right in rear Fig. 17); and Fig. 20 showing reciprocating shear F as beginning to go back to the left to its said position of rest, stock Z now being about to enter funnel H4 and passage 102 of the receiving and temporary supporting apparatus by being fed thru the dies for a relatively long time (not only during the instant while F is being moved back but while it remains at left in its normal position of rest) pending the next excursion of F to right and back to left at a time controlled by the operation of master piston V' (Fig. 6) according to the setting of the dial 15 (Figs. 6–7) for predetermination of the length of the cut sub-length, i. e., of the spacing between fabricated portions of the long stock.

In order to cause the above irregular reciprocation of F, i. e., to operate hydraulic (oil) piston rod T and F by way of intermittent excursions from and back to their fixed position of rest at the left, I have provided (Figs. 1 and 6) a "master" for the "slave" piston T. This master is set pursuant to predetermined operating characteristics of the stock-feeding apparatus, (determined by the constructor before completion of the machine), or according to actual stock-feed, so that said master causes initiation of the excursion of slave piston T so that device F (by its tool G') operates on the stock at such time as to effect fabrication on the desired portion of the stock, i. e., usually at uniformly spaced portions thereof. In the example disclosed, the ultimate master is the piston-rod V (piston V' in cylinder W) and associated hydraulic (oil-pressure) apparatus. This master V operates control valve 12 while slave T and device F are at rest, to initiate the excursion of T and F from left to right. This starts in operation the hydraulic slave system (Fig. 6) R, 104, 105 which drives piston T. At the end of the forward stroke of T and F, operations are effected automatically by T via F to reverse the direction of T and F and return them to their uniform zero normal positions of rest at the left, and hold them therein, there to await the next operation of master piston V' timed by predetermination. Master piston V' operates continuously and has a very slow cycle of reciprocation as compared with the extremely rapid intermittent excursions of slave T and of device F both of which normally are at rest; altho all three of them V', T and F have the same number of excursions in a given time, because T and F are started to right from rest each time that master V' moves to the right. Thus in this example, it is the predetermined frequency of the excursions of master V' which determines the frequency of the irregular intermittent brief excursions of T and F.

The operator (looking at Fig. 1), preparatory to supplying the machine with a coil of un-processed stock, (which may be 300–400 feet long), unlocks stock-supporting reel A (then empty), by extracting lock-pin 81 from its seat in L (the machine pedestal or bed-casting). This frees handle 80 to allow the operator to use it to tilt empty reel A from its normally operative vertical position to the horizontal coil-loading position abutting the floor as indicated by the broken lines, the foot 87A swinging anti-clockwise free of the floor. A heavy coil Z of un-processed stock on the floor then easily is looped over the drum of reel A, and reel and coil are raised to the vertical operative position (full lines) by means of handle 80, aided by the weight of the mass of metal parts 87 and 87A counterbalancing heavy coil Z. Then lock-pin 81 is re-inserted thru handle 80 into bed-casting L. Then, with feed-rolls C rotating at full speed, the operator next threads the van or free end of the un-processed stock Z from reel A thru guide B, and pushes it beyond into and between the first vertical pair of rotating rolls C, (Figs. 1 and 5), whereupon the straightening and shearing operations are effected automatically.

Usually, the machine is running at full optimum speed (with feed of stock preferably at about a hundred feet per minute) while fresh rolls of stock successively are put on reel A and the van of the stock is threaded and pushed as above. Normally the machine is stopped only at the end of each half-day's run or as needed for oiling.

When rolls C pull the stock to right, such pull acts against foot 87A on the floor thereby bracing the reel A in vertical position against the pull on the stock. When foot 87A is employed, it is not necessary to employ lock-pin 81.

Rolls C (Fig. 5) are grouped in two tiers or rows and longitudinally positioned in each row, the rows being located on the two sides of the path of feed of stock Z. The row of rolls C on the side of stock Z away from the operator are mounted rotatably in fixed position in respect to roll-support 88. The row of rolls C next to the operator (shown in Fig. 1) are mounted rotatably in the transversely adjustable boxes 85—86 (Figs. 1 and 5). The rolls in both rows are rotated positively by a series of inter-meshing gears 89 and 89D (Fig. 5, pitch-diameter circles). These intermeshing gears are driven thru one of their number, 89D, the spindle of which (not shown) extends downward to worm gear O, Figs. 1 and 9. The roll-supporting boxes 85—86, six in number, (arranged in three pairs), on the operator's side of the machine, are transversely adjusted by the rotary action of the six threadedly attached adjusting screws 84, Figs. 5 and 9. These screws 84 are journaled in the roll-support side-plate 90, Fig. 5. On the end of the adjusting screws 84 which is opposite roll-boxes 85—86, spur gears 83 are mounted rigidly (Figs. 1, 5 and 9). Intermeshing with the three sets of spur gears 83, are the spur gears 82A, Fig. 9. These spur gears 82A, when rotated by the operator by means of the handwheel 82 (Figs. 1, 5 and 9), of which they are an integral part, impart rotary motion to the two associated adjusting-screws 84, which in turn cause transverse movement of the boxes 85—86 and rolls C to be acted upon.

After the van of stock Z leaves the last vertical pair of the rolls C Fig. 6, (which feed it to flier D after preliminary straightening by the staggered rolls between the first and last vertical pairs) said stock-van continues to travel (left to right, Figs. 1, 5 and 6) and next enters the hollow rotary straightening flier D, (Figs. 1, 5, 6, and details in Figs. 22-29) and is pushed and pulled thru the staggered (Fig. 22) plurality of straightening dies N (Fig. 28) by which the stock is subjected to one or more bowings in the flier. During this process thru the dies in flier D the latter is rotated, thereby kneading the stock via dies N, and rearranging its molecules thereby executing the final straightening operations.

Each straightening die comprises a wearing piece N preferably of non-ferrous metal, (Figs. 27-28) which is grooved to conform with the cross-section size or diameter of the stock to be straightened. This wearing die N is locked in a hardened steel holder N', Figs. 24-26 and 29. The graduated off-center positions (staggering) of the various sets of assembled dies N (Fig. 22) are obtained by adjustment of clamping screws 91 (Figs. 22-23). As shown, two successive dies in the example shown are most off-center from one another at the left where stock Z first enters flier D; then gradually, toward the right, the dies are more nearly in alinement; and finally, at the right, the last two are very nearly in line with one another. Each of dies N is housed in its self-locking support N', the latter being formed at N2 to guide the fed stock Z from die to die. The hexagonal cross-section of wearing-die N provides a substantially solid seat diametrically opposite each of its semi-circular wearing grooves (Fig. 28). It is also valuable that this particular form of cross-section of die provides desirable means for locking the die in its holder N'. Stock (preferably non-ferrous) for these improved wearing-dies N with the special cross-section shown, readily can be produced by the fabricating mills in substantial lengths which can be sawed into the desired short lengths of die N ready for insertion in supports N' without any other machining.

Straightened stock Z, after emerging from flier D (Fig. 1), passes out over the grooved anvil-roll 79 (detail Figs. 10-11), where it is seized by one of the alternately-acting stock pullers E (Fig. 1, detail Fig. 8), between the stock and the integral stationary parrot jaw. In fact, it is the alternating operation of the two pullers E which insures passage of stock Z from left to right thru straightening flier D. Each puller E is pivoted on a sliding quill 92, (Figs. 1, 11 and 12) and is confined in its position thereon at one end by the floating bronze shoes 68 of the quick-return-arm 69, (Figs. 1, 11 and 12). On the other end of puller E (Figs. 11 and 12) it is confined in its position on quill 92 by the swinging-jaw anchor-plate 77, the latter being secured to the end of quill 92 or integral therewith. The assembled quills 92 and anchor plates 77 (Figs. 11-12) are mounted slidably on dead shafts 67 provided with a plurality of longitudinally inserted keys 67' or integral radiating ledges. These extending members 67' prevent radial movement of the assembled quills 92 and anchor plates 77, the bores of which are splined to correspond with the extending keys or ledges 67'. Swinging jaws 78 are pivoted to anchor plates 77 by the turnbuckle connections 93. By regulating the turnbuckle sleeve 76, the amount of grip of the swinging jaws 78 on stock Z may be varied to suit the size of the stock being processed. Synchronously with the gripping of the straightened stock by stock-puller E, its threaded half nut E" engages with the rotating feed-screw 52 (central in Fig. 12). This imparts a longitudinal pulling force (left to right, Fig. 1) to the stock-pullers E and seized stock Z, thereby drawing or pulling stock Z to the right out of flier D. Feed-screws 52 are assisted in exerting a horizontal pulling force on pullers E, by means of the counter-balancing weights 66 (Figs. 1, 8 and 10) which are suspended by suitable chains or cables 61 passing over a series of guide-sheaves 61 (Figs. 1, 10 and 11). The masses 66 also function to disengage the threaded half nuts E" from feed screws 52, releasing the grip of jaws 78 of pullers E from the straightened stock, by causing the cam bar 59 (Fig. 14) to slide up the inclined cam faces of stationary guide-cams 60, where cam-bar 59 remains until, at the end of the quick-acting cam-operated return stroke, stock-puller E contacts with the left-hand end of cam-bar 59 (Fig. 15) forcing the latter down the inclined cam faces of cams 60 (Fig. 16) and thereby lowering puller E to engage the threaded half-nut E" with feed-screw 52, and seizing the straightened stock with the gripping-jaws 78 for a new feeding stroke. The power for operating the quick-return stroke of the stock pullers E is received (Figs. 9-10) by the worm gear P on shaft Q, from the jack shaft 10. Also on shaft Q, (Figs. 1 and 10) with the worm gear P, are the quick-return cams 73, which are mounted diametrically opposite and thus act alternately on cam-rolls 71 which are secured to the side of the quick-return-arms 69, by the roll studs 72. The quick-return-arms 69 are pivotally mounted on the dead shaft 70, so that when the rotation of shaft Q brings one of the cams 73 into actuating engagement with cam roll 71, motion is imparted to one of the quick-return-arms 69 (against the gravity of weight 66), with the result that the floating bronze shoes 68 (pivotally mounted in the bifurcated top end of the quick return arm 69) act on the quill 92, and slidably return the latter, with stock-puller E, to the position shown in Fig. 16, where the quill 92 and co-acting parts are again governed by the lead of feed-screws 52 on the forward feeding stroke as previously described. Feed screws 52, (Fig. 10) are rotated from jack-shaft 10, on which is integrally cut a spiral gear (pitch-circle 53). Rotation of this spiral gear operates large spiral gears 54 (Figs. 1 and 5) mounted on the ends of the inclined shafts 55. These shafts 55 are substantially mounted in pillow-block bearings 56. At the uppermost ends of shafts 55 are mounted spiral gears 57 which mesh with and drive spiral gears 58 mounted on the projecting ends of feed-screws 52, Fig. 10.

In lieu of stock-pullers E there can be substituted one or more pairs of the well known feed-roll mechanisms each consisting of a pair of large-diametered positively-rotated pinch-rollers grooved to the shape of the wire or rod stock, such pulling feeds being preferable (on account of their greater simplicity) for wire or rod machines such as here disclosed by way of example.

The stock Z, (after the above straightening or other desired partial fabrication or fabrication prior to shearing), after feeding to the right (Figs. 1 and 17) beyond the range of pullers E, passes further and thru device F as by way of the orifices of the now and normally alined shearing dies G, G' (Fig. 17), the stock van then further traveling into passageway 102 (Figs. 2 and 4) formed between the guides H and H' of the apparatus which receives the end of the stock which is to be cut aff and supports it before and while it is being cut off.

When most of the length of stock Z to be cut off has passed thru shear F in its position of rest, (left Fig. 1), oil-valve 12 is operated to initiate hydraulic pressure against the left of slave piston T, (Figs. 1 and 6) this piston T being rigidly affixed to reciprocating shear F. At this time shear F is in its zero position of rest at the left, to which position F always returns after its successive shearing operations. The operation of valve 12 causes F to be moved forward a few inches to the right which movement is substantially at the same rate as the stock feed at least while vertically movable die G' is in shearing engagement with the stock. About midway of such forward stroke, vertically movable die G' (Fig. 18) alongside horizontally movable die G is moved down, and the stock thereby is cut off between the two dies at a point which insures uniformity of cut lengths. The downward motion of die G' is caused by the forward motion of F which carries both dies G and G' to move them both horizontally. Said forward motion of F operates links 22 (Figs. 8 and 18) to give them a scissors-like toggle action, co-acting with the lever-crank 24 held stationary by the brake 26—28, and such action of links 22 pulls down support or carrier 16 of die G' (Fig. 18) against coil-spring 19 normally holding 16 up. Further description of this toggle-linkage succeeds the following description of the timing of the operations of the dies or other tools.

The forward stroke of F is initiated at an instant which is predetermined (for any desired operator's setting of choke-valve 15) to cause the quickly succeeding downward movement of die G' at the instant which causes the cutting of the stock in motion at the point which insures uniformity of cut lengths and causes such cutting at that portion of the forward travel of the dies with the stock when they are moving at substantially the same rate as the stock. Shear F is reciprocated by hydraulic slave piston T connected to F (Fig. 6) the substantially incompressible oil being put under pressure by the standard variable-delivery high-pressure slave pump SP (Fig. 30) in casing R to be described. Slave valve 12 controls piston T in its cylinder S. While F is in its normal or zero position of rest at the left (i. e., during the relatively long time during which most of the sub-length Z' of the stock to be cut is being fed thru F, Fig. 17), slave valve 12 (Fig. 6) is in its neutral position (horizontally intermediate, Fig. 30) and no oil pressure is applied to either side of piston T, altho pipes 104, 105 are full of oil so that the forthcoming movement of valve 12 will act as a quick clutch to put operating pressure on the oil in pipe 104 instantly when high-pressure supply pipe 13 is connected with 104. The start of T and F to the right on their brief intermittent short excursions of a few inches (after most of the stock Z' of a given cut, as several feet, has been fed thru F in the zero or rest position of rest) is initiated by movement of slave valve 12 from its mid position of neutrality to its position at the right (Fig. 30) where it admits oil to the left of piston T via pipe 104. This initial or rightward movement of valve 12 is initiated by movement of master oil-driven piston V' which reciprocates slowly in its cylinder W all the time both while shear F is at rest and while slave piston T and shear F are reciprocating together at a more rapid rate of motion than master piston V' but intermittently at the same cycle frequency as piston V'. The instant when slave valve 12 moves to the right to move T and F to right is determined by the frequency of reciprocation of master piston V', and that frequency is determined by the adjustment of throttle 15 (Figs. 6, 7 and 30) which carries the scale calibrated in accordance with the operating characteristics of the machine especially the stock-feeding means or rate of stock-feed, thereby predetermining the length of the cut stock Z' and causing appropriate movement of the operating parts.

Thus, if it is desired to cut the stock into uniform lengths Z' of, say, nine feet, throttle 15 is set at nine on its scale. With shear F in its normal position of rest at left but due to be moved to right for shearing, the master piston V', approaching the end of its stroke to right, carries cam X to right against roller 43 thereby moving bell-crank 42 (pivoted at 41) anti-clockwise to move its lower end (pivoted to tripping-bolt 37) to right thereby forcing also to right the piston-connection 44 (fixed to bolt 37) and also moving to right the piston-rod 12P of the piston inside the casing of valve 12, thereby moving the latter to its right-hand position opening the valve intake port (Fig. 30) from the oil-pressure supply-line 13 (and pressure accumulator Y) and thereby supplying oil-pressure to the oil in pipe 104 leading to slave-cylinder S at left of slave-piston T. Thereupon T moves shear F quickly a few inches to right (during continuous feed of stock to right thru F) and causes the shearing operation of Fig. 18 at about the middle of the forward (rightward) stroke of F, by the downward movement of die G' as shown (Fig. 18). The above movement of bolt 37 to right thru its journals or pillow-blocks 40 compresses coil spring 38 between stop-collar 39 and pillow-block 40. Bolt 37 in its right movement also forces lock-collar 33 under the tripping-latch of bell-crank lever 31 to hold said bolt 37 in its right-hand position and against spring 38 in readiness for bolt 37 to be shot to left by spring 38 after the shearing operation in order to operate valve 12 to reverse piston T and shear F to the left. Cam U is mounted in T-slot 97 to be adjustable via bolt 93 (Fig. 19) during construction of the machine in order to permit calibration of throttle-dial 15 to the operating characteristics of the machine as to rate of feed of stock.

If desired, crank 42 can be operated manually, by the handle shown, to start F to shear stock Z at any desired point.

The details of the apparatus by which the horizontal forward movement to the right of shear F as a whole, moves die G' downwardly and upwardly, are as follows, from which it will be apparent that the power for the shearing operation by the downward movement of die G' is provided by the oil-pressure led to left of piston T via valve 12, i. e., that said power is applied by way of the rightward movement of shear F. Carrier 16 (shear-gate) for vertically movable tool G' is housed for vertical movement in carrier F for tool G by retaining-plate F' (Figs. 17–20). Carrier 16 is supported on its two integral trunnions 16a by the lower ends of two links 22 (Figs. 1, 8, 17–20) swinging on said trunnions. The upper ends of links 22 (Fig. 20) are pivoted on trunnions 23 of lever-cranks 24. Cranks 24 are mounted rigidly on transverse fulcrum-shaft 25 pivotally supported in stationary upper extensions L' of bed-casting L (Figs. 1 and 8). Shaft 25 projects to the rear of the machine beyond said extension L', and said projecting portion is secured rigidly to brake-drum 26 (Figs. 1 and 17–20) encircled by a flexible brake-band 28 (Figs. 1, 8 and 17–20) lined (at 27, Fig. 17) with suitable frictional material as leather. Brake-band 28 is anchored to the back of bed-casting L by stud 94, (Figs. 17–20), and is adjustable (for tensioning) by means of bolt 95 which passes thru the terminals of band 28.

Said brake mechanism holds fulcrum-shaft 25 and lever-cranks 24 against motion during the first half of rightward movement of carrier F (Fig. 1).

When carriers F and 16 are at rest at the left (Fig. 1 front and Fig. 17 rear) links 22 are inclined about one o'clock as shown. When F and 16 start rightwardly they move trunnions 16a rightwardly and since cranks 24 meanwhile are braked by 26 and 28 the result is that the upper ends of links 22 pivoted to 24 at 23 are kept stationary the links 22 therefore turning on trunnions 16a anti-clockwise from their one o'clock positions of Fig. 1 to their twelve o'clock positions of Fig. 18. Carrier 16 and trunnions 16a normally are held up by spring 19. But they are depressed by links 22 and so die or tool G' is moved downward alongside and below stationary die G to shear the stock Z during the forward stroke of F at about the middle of said stroke.

The above arrangement of linkage for actuating die or tool G' down for the shearing action is such that the horizontal forces of moving shear F, transmitted thru to the trunnions 16a of die-support 16, are amplified in the proportion of one and one-half to two and one-half, i. e., three to five. That is, assuming a five-ton horizontal force moving shear F, that force is increased by the above arrangement to approximately 16,700 pounds available to act on die or tool G' for the shearing operation. The area of a ⅝" diameter rod is .295 square inches, which area, assuming a shearing strength of 60,000 pounds per square inch for steel, requires a shearing load of 11,700 pounds, leaving tolerance in this machine of over 42% on the basis of the above five-ton force by slave-motor S—T to move shear F horizontally.

As to the return or upward movement of die or tool G' after its shearing operation. The first portion of the forward stroke of F which has carried die or tool G' down thru its shearing action also carries (adjustable) screws 21 to right abutting the cranks 24 braked stationary as described heretofore. Then:

During the second half of this forward movement of F (left to right, Figs. 18 and 19) screws 21 rotate lever-cranks 24 clockwise against the retarding force of brake-band 28. This forced clockwise rotation of cranks 24 (the force applied acting midway of linkage connections 23 and 25), advances trunnions 23 (Fig. 19) double the horizontal distance traversed by F and the trunnion 16a of die-support 16, (the trunnions 23 describing an arc having a radius which is double that where the force is applied by screws 21 to links 24), so that the horizontal movement of trunnions 23 will be twice that of shear F during the latter half of its forward stroke to right, (i. e., a distance equal to the full forward stroke of F), causing the linkage, (actuated by the tension of spring 19) to open up the scissors-like toggle action of links 22 and raise support 16, with supported die or tool G' thereon, up so that said die is in alinement with stationary die G (Fig. 19) so as to permit the continuous feed of the uncut stock Z coming from the left. This raised position of die-support 16 is maintained during the return stroke of F (right to left, Fig. 20) because there is no tendency for the various linkages to close; and thereby F is free to move back to the left while the stock continues to be fed thru it toward the right. Compression spring 19 encircles extension 16' of die-support 16, Fig. 17, and is seated on large washer 20 on F. Tension is maintained on spring 19 by small washer 18 and the threaded nuts 17.

(As soon as die G' has been moved up by spring 19 to its normal position of alinement, Fig. 19, shear F is ready for its return stroke leftward and brake 26—28 usefully checks rightward movement of F after the shearing cut and toward the end of the forward movement of F in cooperation with the balance of oil-pressure on the faces of piston T while valve 12 is being moved thru neutral in its change reversing F).

By the above operations the stock has been sheared into equal lengths which are ready to be discharged from the shearing apparatus into receiving-apparatus constituting a part of the machine and serving for temporary storage.

The stock-discharging mechanism comprises mainly two work-guides H and H' (Figs. 3–4, 19–20). Stationary work-guide H is substantially attached to the overhanging goose-neck top of uprights J (Fig. 4). Movable discharging work-guide H' is pivoted to the lowering-arms 49 and 51 by upper pivot-studs 48 (Figs. 1, 3 and 17). Movable work-guide H' is formed with a groove 102, (Figs. 2, 4 and 17–20) extending thruout its entire length on its side adjacent to stationary guide H. These guides (forming closed passage 102 to receive the sheared length of stock Z' about to be cut off) are long enough to accommodate the maximum cut sub-length of stock, as twelve feet, more or less. Work-guides H and H' are provided with portal pieces H2 and H3 (Figs. 17–20) mounted on their ends adjacent shear F. Said portal-pieces are provided with channels which when in register form a funnel-shaped guide H4 to groove 102 or passage-way in guide H'. This funnel facilitates entrance of stock Z to passageway 102 (Figs. 17–21). Lowering-arms 49 and 51 are mounted pivotally on the lower pivot-studs 50 in the two uprights J (Figs. 1–4). The latter are screwed into uprights J, forming a rigid pivotal support for arms 49—50. An upward extension of lowering-arm 49 nearest shear F (Figs. 1 and 17) is pivoted to the operating connecting-link 46, by means of stud 47. The other end of link 46 is secured by connecting pin 45 to carrier F of tool G (which moves only horizontally) by means of a pintle 45 extending thru a boss on plate F1 which constitutes a portion of carrier F, so that link 46 is reciprocated longitudinally by the horizontal reciprocations of the entire traveling shear-head F, 16. That is, as tool-carriers F, 16 move forward toward upward J, Fig. 17, the left end of link 46 and the upper extension of arm 49 are moved forward thereby, and that causes arm 49 to swing counter-clockwise on its bottom pivot 50 fixed in stationary upright J, Figs. 17 and 1, so that pivot 48 is given a curved motion, partly away from shear-head F, 16 and partly downwardly. Since one end of stock-support H' is pivoted at 48 to arm 49, Figs. 1 and 17, and since the other end of support H1 is pivoted at 48, Figs. 2–3, to the other arm 50, therefore both arms 49 and 50, paralleling one another, participate in the above counter-clockwise movement of arm 49 in Fig. 17, and cause support H' to be maintained horizontal while it is moved forward away from forward moving shear-head F 16, and downwardly out of the stock-path. The effect of this downward movement of support H' is described below, as to the discharge of sheared-off sub-lengths of stock. The utility of the forward movement of support H' by means of the two parallel arms 49, 50 and the above system of pivoted links, is as follows, Figs. 17–20, with reference to the few-inches stroke of horizontally traveling shear-head F, 16. In Fig. 17, stock Z moving right to left, the head F and link 46 are in their normal positions of rest, between successive shearing movements, and stock Z is advancing thru tool G, its van passing along support H' receiving it and supporting it in position for the next shearing cut by tool G'. In Fig. 18, stock continuing its advance, here left to right, head F has been moved rightward over half its forward stroke toward first upright J, Fig. 1, and has moved H1, by means of link 46, forward alongside fixed support H, and sub-length Z' has been sheared off by the downward movement of tool G'. In Fig. 19, immediately after shearing, the distance between head F and the left end of support H1 has been increased, because head has moved H1 faster than its own motion, due to link 46, etc., both F and H' however being here nearly to the end of their forward strokes, and sub-length Z' is dropping and stock Z continuing its advance; so that in Fig. 20, where head F is starting to move leftward against the direction of continued stock-feed, and tool G' is commencing to move up away from the stock-path, and stock Z is emerging from G' at a higher rate than its own feeding movement, then support H' also is starting to move left at a higher rate than the leftward movement of head F so that stock Z and support H move very rapidly toward one another promptly after the discharge of sub-length Z', and about the time the van of stock Z reaches the left end of fixed support H, i. e., before it can sag down too far, the left end of support H' has moved back to the left end of H in position to support the stock-van.

The operation of the above discharging mechanism is as follows. In general, the stock van rests on guide H'. As the sub-length Z' is being cut off arms 49, 51 swing downward in time with the downward movement of die G' and lower guide H' which holding it level horizontally, thereby lowering the cut stock Z' in chamber groove 102 in a horizontal position. As the sub-length Z' is carried below the retaining wall of stationary guide H, it is free to drop into the arms I, I' of the stock-receiving trough I, II'. In detail, when movable work-guide H' is in its normal raised position (lying alongside the stationary work-guide H, Figs. 2–3) stock-passage 102 (open at its left end) is closed on its open side by the adjacent wall of guide H. The stock advancing to right thru shear F is guided by H4 into the closed passageway (formed by the groove 102 and the adjacent wall of the stationary work guide H) and thus the sub-length to be cut off is supported thruout its entire length. Upon the forward stroke of F, movable work-guide H' is carried thru a downward sweeping arc (via connecting link 46 and lowering-arms 49 and 51) which arc more or less parallels the downward movement of die G', Fig. 18. When stock-groove 102 containing a cut sub-length Z' of stock is swept downward past the range of the retaining wall of stationary work-guide H (as in Fig. 19), that sub-length will drop down by gravity from out of groove 102 and will fall into the trough formed by arms I and I' of uprights J (Fig. 3) as parts of the apparatus which receives the successively cut sub-length from this stock-discharging means. Movable guide H' of the stock-discharging means then is returned to its normal position by the same actuating linkage, including 46, as die-carrier F moved up, to its normal position in Fig. 20 in front of the continuously advancing stock.

The means for receiving the cut stock Z' from the above stock-discharging means, is as follows, including the above arms I, I' into which the cut sub-length is dropped from the above discharging apparatus. This receiving apparatus extends from the right of the main portion of the machine shown in Fig. 1 and is shown in Figs. 2–4. It includes (Figs. 1–3) two uprights J (one shown at the right in Fig. 1 and the other at the right in Fig. 2) positioned on the horizontal tubular member 99, the flange 100 of which is secured to bed-casting L. Longitudinal solid bar 101 constitutes additional means to insure rigidity between uprights J, and it also constitutes a substantial support for the intermediate adjustably positioned stock-receivers I', Figs. 2–3.

When a sufficient number of cut sub-lengths are deposited in the trough I to warrant economical removal, any usual or suitable means (as by over-head crane) is employed for such removal without interruption of the operation of the machine.

The instant that stock Z is cut off as in Fig. 18, die G' is moved up as the cut stock Z' drops as above, so that dies G, G' are alined again, as shown in Fig. 19, at a time while their carrier and actuator F yet is moving to the right, so that the continuously fed stock is free to move thru said two dies during the time while the rightward stroke of F is being stopped and its leftward movement is initiated and continued opposite to the direction of stock feed.

Fig. 19 shows F formed with T-slot 97 machined horizontally along its side. Cams U and U' are mounted in this slot by bolts 98.

The position of cam U determines the instant of reversal of F back to its zero position, after completion of the cut in Fig. 18 and the upward return of die G' in Fig. 19.

These cams may be adjusted left and right in slot 97 by bolts 98 during construction of the machine for permanent coordination of its parts. Cam U is set sufficiently far to right to insure sufficient time for permitting upward movement of die G' into alinement with die G before the horizontal movement of F is reversed to the left. The setting of this cam U has nothing to do with determining the cycle-frequency of T and F. Cam U (Fig. 6) operates against roller 29 and cam U' against roller 34; therefore cam U does not project into the path of 35.

After completion of the shearing (Fig. 18) piston T continues to move F to the right (about half of total stroke) until die G' is moved up to aline with die G (Fig. 19), and cam U hits roller 29 (Fig. 6) rocking bell-crank 31 clockwise and freeing bolt 37 for its shooting to left by spring 38. At this time slave valve 12 is at its extreme right, together with parts 12P, 37, 44 and 42; and master-piston rod V, moving to left, has carried cam X leftward away from 43, so that bolt 37 is free at its left end to be shot to carry all said parts to left. Bolt 37, shot to left, carries slave-valve 12 past its neutral mid-position to its left position, reversing direction of T and F to left, i. e., valve 12 now has its port open (Fig. 30) which connects oil under pressure in 13 (and Y) to the oil in pipe 105 connected to the right end of slave motor S and slave piston T. This initiates the left or return stroke of the brief excursion of T and F which (Fig. 20) now move leftward against the direction of stock-feed (to the right) the next stock-van to be cut off being fed thereupon thru the shearing dies toward funnel H4.

The return stroke of F to rest at left effects movement of piston 12P of slave valve 12 to right to its neutral mid-position stopping T and F and holding them at zero or rest during the feed to right of most of the stock Z for the next cut, i. e., until the next operation of master-cam X. This rightward movement of 12P is caused by cam U' (Fig. 6) which, carried by F to left, hits roller 34 to swing lever 35 counter-clockwise which moves bolt 37 back toward right (just after its shooting to left by U and 38 to reverse valve 12) far enough to move slave valve 12 partly to right to its neutral mid-position wherein it unclutches the oil in pipe 105 from the oil under pressure in pipe 13.

Altho it is simplest and best to have the return stroke of T and F effected at the same rate as their forward stroke, yet there is no need of rushing them back to their normal position of rest and they can be returned more slowly by any suitable arrangement if desired for any reason. During the subsequent period of rest of T and F, accumulator Y is connected exclusively to the system 13 (Figs. 6 and 30) so as to cause energy to be stored in spring 14. Said rightward movement of bolt 37 also swings lever 42 a little counter-clockwise thereby putting roller 43 in position to be engaged by master cam X for the forward stroke of the next excursion of piston T and shear F to move the parts to right and compress spring 38 and lock the bolt 37 at 33 in readiness for the above described shooting of the bolt 37 to left (for the return stroke of T and F) when cam U is carried to extreme right by F against roller 29. Cam U' is adjustable in slot 97 (Fig. 20) for use in the construction of the machine; a part of such construction including the coordination between the stock-feed and master controller 15. But all the four cams U, U', X and X' after calibration of the dial of throttle 15, can be locked permanently, because they require no subsequent adjustment, since the machine is designed for permanent zero position of rest of shear F, irrespective of the rate of the stock-feeding means, so that the only control-variation is for different uniform sub-lengths of cut stock is by way of master throttle 15. When 15 is set for the desired length of cut stock (or spacing between fabricated portions) all that is necessary is for the operator to insert in the machine the end of a coil of stock.

The above parts for operating shear F remain in the above neutral positions during the period of rest of F at the left and until master piston V' and its rod V and slide 103 again automatically move sufficiently far to the right to swing lever 42 and start the next excursion of T and F, the time intervals between successive occurrences of such action being governed wholly by the adjustment of choke-valve or throttle 15.

Thus the function of the master control 15 is only to start said excursions of F at the end of each cycle of master piston V', by moving valve 12 to extreme right to apply pressure to left of piston T. Slave valve 12 is operated by the automatic controls other than the master piston V', i. e., by cam U to reverse slave piston T by moving valve 12 from extreme right to extreme left to apply hydraulic pressure to the right of T; and cam U' to move valve 12 from extreme left to neutral mid-position to hold T and F in their normal rest positions at left. Master piston V' simply moves slave valve 12 from neutral mid-position to extreme right, and with a periodicity determined by the setting or adjustment of throttle 15.

With a given manual setting of master throttle 15 and the operation of the machine at its normal constant feed, the machine will continue to deliver uniform sub-lengths of cut stock (i. e., in general, stock with uniform spacing between successive fabricated portions), as long as the machine is supplied with coiled stock on reel A feeding thru rolls C. The solid connections operating the feed at rolls C and pullers E are driven (preferably) by the same power source (electric motor K preferably having constant speed) which operates the hydraulic system to provide oil-pressure to reciprocate shear F, the extent of excursions of F and the rate of F during excursion being predetermined by coordination of the hydraulic drive of F with the normal rate of stock-feed; and master motor W is coordinated with the feeding means or by the stock actually fed, and with the movement of F by the hydraulic drive; all of which results in uniform sub-lengths of cut stock. Under these conditions the only means of varying the lengths of sub-length of stock cut (other than the manual operation of lever 41—42, Fig. 6) is by adjustment of choke or throttle 15 according to its dial-scale, as above, or by control by the fed stock of a target hit by the stock and to be described. When dial 15 once has been calibrated there is no advantage in moving any of cams U, U', X or X' and they may be and preferably are made so as to be thereafter permanently non-adjustable. Since there is permanent coordination between the constant-speed stock-feeding means and the fabricating mechanism F, therefore the rate of the forward movement of shear F is substantially the same as that of movement of the stock, at least while G' is passing down across the stock and the excursions of F never vary in space no matter how they may vary in frequency, the length of stroke of F and the starting point of its excursions being always the same. Of course, for different settings of throttle 15 for the uniform cutting of different sub-lengths of cut stock, the frequency of the excursions of F is different, notwithstanding that these excursions never vary in space; for according to the invention, such changes in excursion-frequency of F are provided for, as by the excursion-frequency of master-piston V' (or by the target construction to be described), and the latter is readily variable by the operator's adjustment of calibrated throttle 15 (or the calibrated target).

When throttle 15 is wide open the maximum oil-pressure then acting on slave motor W will move it at its highest rate and reciprocate it at its highest frequency resulting in a correspondingly high frequency of intermittent excursions of slave piston T and shear F and consequently in the shortest sub-lengths of cut stock as indicated on dial 15. And the various positions of adjustment on dial 15 will produce corresponding differences in the uniform lengths of sub-lengths of cut stock. As shown, dial 15 may be calibrated for all desired lengths between one and sixty feet according to the capacity of the machine as designed.

With stock Z fed at its constant optimum feed rate of about twenty feet per second, and F having excursions of about three inches forward and three inches back, each excursion of F will be completed in three-tenths of a second (or more particularly the transit of F from its position of rest to its position where G' shears stock Z, at about the middle of the forward stroke of F, will be effected in about three-fortieths of a second) in order that at the time of the fabricating operation, F and G' may be traveling at substantially the same rate as the fed stock. In order to effect this cooperation, the hydraulic drive of F, operated by common main driver K, is coordinated permanently with the feed of stock Z which also is effected from K; all this being independent of the master control which determines the length of the periods of rest of F in accord with the stock-feed, either by coordinating the master motor W with the feeding means C and E or by controlling motor W by the van of the stock as by the target apparatus to be described.

The operation of master-piston V' is as follows. Starting from the instant when cam X (Fig. 6, carried by master piston rod V to which against roller 43) has initiated the short, rapid excursions of slave T and shear F from their periods of rest at left, the operations are as follows to maintain the slow continuous reciprocation of master-piston VI and rod V. A slight further rightward movement of master V carries cam X' against roller 107 which swings reversing lever 108 clockwise on its pivot at its lower end and moves connecting-rod 109 horizontally to right causing clockwise movement of lever 111 on its pivot 117 which moves valve-piston 112P of small reversing valve 112 to the left to change the supply of oil-pressure from pipe 115 to pipe 116. Thereupon master V is reversed and moves from right to left, and cylinder W exhausts thru pipe 115 back thru valve 112 and pipe 114 to the gravity oil-reservoir inside the bottom of casing R. The leftward movement of V eventually carries cam X' against roller 110 imparting an anti-clockwise swing to lever 111 which moves valve-piston 112P to the right to change the supply of oil-pressure from pipe 116 to 115 and cause forward motion of master V. During all this time of slow continuous reciprocation of master V the stock has been feeding thru shear F in its position of rest at the left. Finally master V carries cam X against roller 43 to cause the next short and rapid excursion of slave T and shear F, the forward stroke of which is terminated by the leftward shooting of bolt 37 to reverse slave-valve 12 and slave piston T. Cam X is quickly carried to the left out of the path of roller 43 moved to the left by said leftward shooting of bolt 37, by a prompt reversal of piston V'. This is obtained by leaving the space to the left of piston V' free of extension of connecting-rod V to the left of piston V', so that the cylinder space to the right of the piston and around the rod (in the left position of the piston) is smaller and therefore can be filled with the oil from pipe 116 when that is put under pressure by being connected to pipe 113 from pump MP (Fig. 30), more rapidly than the space to the left of the piston, thereby causing V to move more quickly to the left than to the right; all as contrasted with the piston in slave cylinder S which moves at the same rate in both directions owing to the extension of its rod T thru both ends of cylinder S (Figs. 1 and 6). The above irregularity of forward and backward motions of master piston V' does not affect the proper timing of action of cam X because that action is timed definitely for each complete cycle of reciprocation of V'. But the more rapid leftward movement of piston V' and cam X hurries the latter out of the path of leftward shooting of bolt 37 which follows very shortly after cam X moved to right has moved bolt 37 to right.

The wider the throttle 15 is opened, the greater will be the cycle-frequency of master-piston V', slave T and fabricating device F, with consequent shorter spaces between fabricated portions of stock Z.

*The hydraulic system, Figs. 1, 5, 6, 30.*—In the form disclosed, this comprises the apparatus inside casing R and that outside said casing.

The hydraulic apparatus outside casing R, Figs. 1, 5, 6, 30, includes the two valves (12 and 112), the two motors (S and W), all being of standard oil-apparatus construction, and the oil-pressure accumulator Y, here provided for use in accumulating energy during the prolonged pauses of F during the stock-feed, and then expanding such energy conjointly with the oil-pumping system to carry the shearing load, thereby permitting economy by the selection of a lower-powered oil-pumping system.

The hydraulic apparatus inside casing R includes (Fig. 30) the slave pump SP, the master pump MP, and other mechanism to be described and involving cooperation between said two pumps whereby together they constitute an unitary variable-pressure pumping system for operating the intermittently-acting fabricating mechanism F; both said slave and master pumps being useful together for the operation of F by SP; and master pump MP having an additional function in operating master cam X.

Master pump MP is a small low-pressure gear-pump of standard type, delivering about 100 lbs. oil pressure per square inch.

Slave pump SP itself is a high-pressure variable-delivery pump of standard type, delivering oil pressure according to different adjustments as desired from 300 lbs. to 1,000 lbs., which is why it is called a variable delivery pump. The details of this pump SP are not necessary to be described, for the preferred pump described generally is of standard type and it may be for example, the type WE high pressure variable delivery pump as made by The Oilgear Company of Milwaukee, save that here this pump delivers the pressure always in one direction, (due to the character of the control mechanism to be described) i. e., from high-pressure pipe 13 to lower pressure or return-pipe 106; hence valve 12 is used here to permit reversal of slave motor S here shown as a reciprocating motor. There always is pressure in return pipe 106, i. e., of about 30 lbs., and altho normally, even when the machine as a whole is operating while shear F is stationary, there is no pressure on the then static oil in pipes 104, 105 leading to motor S then closed by valve 12 from high-pressure system 13.

While pump SP can deliver different maximum pressures according to its predetermined setting to be described (by PC1 and PC2), yet alone by itself it may vary its pressure delivery in accord with the demands of the shearing load on F. For that purpose pump MP here is combined with SP in a manner to be described, so that the combination will deliver pressures which vary automatically in accord with the demands of load F.

In the present invention the combination of pumps SP and MP is set permanently (details in Fig. 30 described below) to cause maintenance of the desired maximum pressure in 13 and Y by the delivery from SP. When the entire machine is in operation, the pressure-delivery from SP below such pre-set maximum is varied automatically by the loads of the starting of an excursion of F, of operating the shearing tool G', applying the brake 26—28, etc. This automatic variation of pressure-delivery from SP below said pre-set maximum limit is effected instantly by any and all of said loads. The desired speed of the pumps is determined by such pre-setting of the volume-delivery of pump SP. This pre-setting is via valves PC1 and PC2 to be described later. The desired maximum delivery of SP is maintained at such pre-set rate at all times when the pressure in pump system 13 is less than the pre-set maximum. Whenever the pressure in 13 attains the pre-set maximum, then the volume delivery of SP is reduced automatically to just enough to maintain that maximum pressure. When the volume-delivery once has been set (for a given pressure delivery) the volume delivery does not vary with varying loads so long as the load does not exceed the maximum pressure capacity as pre-set. A desirable volume-capacity for such pump in the present invention is about 0 to 3,000 cubic inches of oil per minute at any pressure from 300 to 1,000 lbs. as above. A desirable speed of sheave 11 is 860 R. P. M., sheave 11 being preferably of 16 inch diameter with a four inch belt connected to constant speed main-drive electric motor K Fig. 1. The maximum power input needed for heavy duty is ten H. P., altho five H. P. may be sufficient in cases of lighter stock Z. If desired, as for shearing different thicknesses of stock Z, the maximum-pre-set pressure-adjustment for delivery from oil-pump SP may be changed by the operator of the machine for special jobs.

High-pressure slave pump SP (Fig. 30) for valve 12, slave T and shear F, acts as follows in the combination with intermittently reciprocable fabricating mechanism F, and with accumulator Y to be described. While SP is operated continuously by sheave 11, yet its automatically variable pressure-delivery is comparatively low and may be zero toward the end of the period of rest of T and F, i. e., when valve 12 is in neutral and prior to the operation of said valve by master cam X, and after Y has been charged. During the first part of said period of rest of F the pressure delivered by pump SP is (by its automatic adjustment to be described) no more than sufficient to maintain the pre-set maximum pressure in line 13 and in spring 14 of accumulator Y, and to compensate for normal oil leakage, maintaining a pressure of about, say, half a ton per square inch in the pipe-system 13 connected to valve 12. If and when equilibrium of pressure (maximum as pre-set) has been established in said closed system including Y, (such as prior to the end of the period of rest of T and F), then pump SP in effect automatically idles (save to compensate for any oil leakage) until master cam X is operated to operate valve 12 to connect the oil under pressure in line 13 and Y to the static oil without pressure in line 104 leading to left of slave piston T. During said period of rest of T and F the oil in pipe-system 13 also is static altho pressure then is being increased to the maximum as determined by maximum pressure-adjusting valves PC1 and PC2 (Fig. 30). The pressure in the system 13 and Y acts at all times to govern pump SP (via MP) automatically by controlling its stroke and thereby its pressure-delivery from zero to maximum,—the shortest stroke being after the establishment of the above equilibrium of pressure, if ever, (then compensating for oil-leakage and keeping system 13 full of oil under the high pre-set pressure) and the longest stroke being at such times just after the automatic operation of master cam X, as the load (intermittently operated shear F and die or tool G', etc.) is maximum on the pump jointly with accumulator Y. But at the time that the high-pressure oil in 13 is clutched by valve 12 to the load F by way of the normally static no-pressure oil in pipe 104, then pump SP is not operating at its longest stroke altho it is continuously rotated by sheave 11. This fact is important because the shearing load on die G' is very much greater than the inertia load of F and comes on G' (and F) almost instantly after F begins its short stroke of a few inches. At this point the accumulated pressure in Y is availed of.

*Construction and operation of pressure-accumulator Y.*—The object of Y is to supply volume and pressure to slave-motor S in a manner auxiliary to pump SP. Pipe-lines 104–105 always are filled with oil and when valve 12 is at neutral (as in Fig. 30) such oil stands as incompressible and rigid, altho fluid, operating-connections, static and without pressure, but standing by and ready to act on piston T as soon as valve 12 supplies oil-pressure from system 13 to said static oil in 104 or 105, i. e., on either side of the piston. Slave pump SP, being of the variable-delivery type, delivers oil-pressure when needed and up to its maximum as pre-set; but its maximum delivery may not be sufficient to initiate forward movement of F or rather to meet the demands of die G' to move F to shear the stock at a portion of the forward movement of F. Hence accumulator Y is provided to insure adequate power when needed as at the instant of actual stock-shearing. During the relatively long periods of rest of fabricating mechanism F there is ample time for Y to be charged by pump SP via pipe 13.

Oil-pressure accumulator Y (Figs. 6 and 30) is in communication at all times with high-pressure pipe system 13 supplied by SP, so that during the period of rest of slave T and shear F (and while slave valve 12 is in its mid position of neutrality as in Fig. 30) the continued operation of pump SP builds up an hydrostatic pressure in the entire closed system of the pump (pipe 13, Fig. 30) which during this period of rest of T and F is cut off by valve 12 from pipes 104—105 leading to slave motor S. This potential high-pressure pipe system 13 includes accumulator Y (Figs. 6 and 30) in which pump SP effects a storage of energy represented by about thirty cubic inches occupied by oil inside Y which (during rest of F) forces auxiliary piston 118 in casing Y against heavy coil spring 14 therein, compressing the latter and thereby storing energy in the spring for use at the end of the period of rest of T and F in overcoming their inertia and starting their rightward movement, in doing the work of shearing by die or tool G' during such rightward movement, and in braking F by 26—28 after completion of shearing. Spring 14 is backed up by a strong construction including cylinder-head 119 bolted to the main casing of Y by cap-screws 120.

The volume of oil from pipe 104 required to be passed thru said pipe to complete the rightward stroke of T may be greater than the maximum pre-set delivery of pump SP even at the longest of the variable strokes thereof; and such required volume of oil is yet more likely to be greater than the pump can force out of 104 to move master V' to right before the stroke of the pump SP can be increased automatically after the period of rest of T and F, i. e., when the load of F suddenly comes on due to action of master cam X. Thus, upon the automatic action of cam X to connect 13 with 104 (by valve 12), the pressure in 13 and 104 has a tendency to drop, due not only to the load of T but possibly to the lack of capacity of pump SP alone to operate said load at any time at the desired rate; but any such tendency is countered by compressed spring 14 in accumulator Y which expands against the oil in Y and joins with the pressure already existing in 13 and with the (then automatically) increasing pressure from pump SP, in insuring that the oil in 104 shall act effectively against piston T and mechanism F to give them the desired operating kick, compensating for any lack of prompt or total pressure-delivery from pump SP, and insuring following up of piston T by the oil in 104, so as thus jointly with SP to carry T and F at least thru the shearing operation by G' during the forward stroke of F, and so that meanwhile pump SP can have time to build up pressure sufficient so that if Y should have become exhausted), the action of pump SP alone then can keep brake 26—28 on after shearing by G' and can return T and F leftward to their normal position of rest. Then, during the long rest of F while stock Z is being fed by feeding devices C and E, oil-pump SP (operating at longest stroke) has ample time to charge Y again before the time for the next cycle of T and F initiated by cam X. If it were not for this cooperation by Y, piston T might be caused by the load on fabricating tool G' to hesitate in the midst of the action of tool G' on the stock, until pump SP had built up sufficient pressure by its own stroke (now at maximum) to complete the cut; and even a short hesitation of the shearing action would cause interruption of the stock-feed by checking the stock at die or tool G' causing the stock to buckle into scrap and cause stoppage of the machine. But smooth operations are insured by the provision of ample pressure as by the accumulator Y, thereby obviating need of a larger and higher powered slave-pump SP.

The energy thus stored in spring 14 during the periods of rest of T and F is availed of each time that cam X moves slave-valve 12 from its mid-position of neutrality to the right to connect pipe 13 with pipe 104, because then the oil in Y also (under pressure of spring 14) is put in communication via 13 with pipe 104, in addition to the oil pressure already existing in 13 and now being delivered by the pump SP to 13. This combination of accumulator Y with the slave pump is especially advantageous in combination with the fabricator F, because, altho F has comparatively low inertia (its motor S being mounted, not on F itself but on the frame of the machine), yet the shearing load of G' comes on F and T almost instantly after F has started to move rightwardly forward, Fig. 1, and very promptly after slave pump SP (Fig. 30) has been caused to start increasing its pressure-delivery by the load caused by the start of F via X and 112. Thus a motive power is made available and is utilized, consisting of the oil-pressure furnished jointly by accumulator Y and slave pump SP, to effect the intermittent short excursions of shear F and the intermittent shearing action of tool or die G'. While the use of Y will not be necessary in all cases, yet its use always will be desirable in combination with such a device as F, i. e., a fabricating mechanism having a long period of rest during which Y can be charged. The system including slave pump SP acts as a sort of metering system from side to side of intermittently reciprocating piston T as controlled by master cam X.

After the fabricating operation by tool G' has been completed, the automatically built-up drop-pressure of the high-pressure variable-delivery oil-pump SP alone without Y may be sufficient to operate piston T and device F to complete their forward rightward strokes, thereby keeping brake 26—28 applied and releasing catch 33 by cam U to permit bolt 37 to shoot to left and reverse valve 12, and cause the return leftward strokes of T and F thereby moving valve 12 to neutral via cam U'. When T (with F) approaches the end of its rightward stroke and releases valve-piston VP1 of valve 12 (Fig. 30) for movement to left to admit oil-pressure from 13 to 105 to reverse F to left, then said valve-piston on its way to its reversing position at left first gradually (relatively) closes the forward port to 104 at right, (while brake 26—28 is applied), and then passes further to left thru its mid-position of neutrality (shown in Fig. 30 where then both 104 and 105 are shut off from high-pressure oil) before final leftward movement starting to open gradually (relatively) the reversing port to 105 at left. Thus, after the fabricating operation has been completed by F and G', the force acting to move T and F to right gradually diminishes, (while brake 26—28 is applied), first by the possible exhaustion of the energy stored in Y, and then by the gradual closing off of 104, and next, (before 105 is opened for reversal), by the passage of the valve thru its mid or neutral position, thereby removing all pressure in 104 on the left of piston T, brake 26—28 being effective during this time.

The oil-circuit of slave pump SP is shown in Fig. 30 which shows also the master pump MP which (via valve 112) drives master motor W (Fig. 6) to operate cam X initiating excursions of F by T operated by slave-motor S driven by slave pump SP. Both pumps SP and MP are located in metal casing R as shown (Figs. 30, 1 and 6).

Pump MP has two functions as master pump, first to determine the frequency of the cycles of F driven by T, and second, to control slave pump SP itself by way of master motor MM1.

The large high-pressure variable-delivery slave-pump SP may develop a pressure per square inch as high as a half a ton.

Smaller pump MP (a standard low-pressure gear-pump) delivers a pressure of only about one hundred pounds, sufficient to operate motor W for the light duties of operating slave valve 12 by cam X and of operating master motors MM1 and VPM.

*Stroke-changing mechanism for automatic variable pressure delivery by SP.*—This holds the pump to a full-pressure-delivery stroke until the pressure in the high-pressure pipe system 13 connected with the pump SP reaches the maximum pressure for which it has been pre-set. Then this stroke-changing mechanism automatically reduces the length of the pump-stroke to a degree just sufficient to maintain such pre-set pressure continuously. This is important in connection with the special loads here of fabricator F and particularly of tool G', in respect of the promptness with which the well-known stroke of the 4,300 piston movements of SP per minute is increased almost instantly from practically zero (before F starts its excursion) to maximum as soon as F starts to move, so that, particularly with the cooperation of accumulator Y, the entire oil-system is ready to meet the much greater demands of tool G' by the time F has traversed the short path from its position of rest to carry G' to the fabricating position. The construction of this stroke-changing mechanism is as follows.

Master motor MM1 cooperates with variable-pressure motor VPM to operate piston SRP and the control-arm or pendulum CA. Arm CA is held in a position corresponding to the full stroke (full delivery) of pump SP until the maximum pressure is reached for which pump SP is set; then the stroke of SP is automatically reduced to a point just sufficient to maintain such set pressure, as follows. The variable potentially high oil-pressure in pipe system 13 caused by pump SP acts on the right of piston SRP in variable-pressure motor VPM having a small cylinder. The constant low oil-pressure (as 100 lbs.) in pipe system 113 caused by small gear-pump MP, acts on the left of piston SRP in motor MM1 having a much larger cylinder than VPM. The pressure of SP in 13 varies from maximum pre-set high pressure to lower than in pipe 113 and left of piston SRP, according to whether F, G1 and T are at rest, moving freely forward, or in actual shearing action, or with brake yet applied after shearing, or in free motion returning to rest at left without any load save the inertia of F itself, or to charge accumulator Y. The large low-pressure cylinder of motor MM1 holds (via SRP) pendulum CA over clockwise to full stroke of pump SP until the pressure in pipe-system 13 and small cylinder VPM reaches the high pre-set maximum of pump SP which then enables VPM to overcome the large low-pressure area in left of motor MM1. Thereupon CA is moved anti-clockwise toward its neutral position thereby reducing the stroke of SP, thus reducing the delivery of pressure from SP to a point just sufficient to maintain its desired pre-set high pressure in system 13. For example, as the potential or pre-set high pressure of SP (300–1,000 lbs.) in 13 may be decreased on the right of VPM (by the going on or the increase of any of the above loads) to a degree below the lower pressure (100 lbs.) on the left of SRP, the latter pressure moves piston SRP to right, overcoming the temporary low pressure in 13, to move arm CA clockwise and increase the stroke of pump SP thereby again increasing the pressure in 13 so as to meet the demands of the load of T, F, G' or brake 26—28 or to re-charge Y. Therefore, as soon as F starts to move from rest to right, the consequent reduction of pressure in 13 and Y causes increase of pressure-delivery from pump SP compensating for such pressure-reduction and preventing F and G' from slowing down as G' engages stock Z; and this is very important indeed, for the time of duration of the shearing action is the particular and only time when it is essential that the movement of F in the left to right direction of the stock-feed shall be at substantially the same rate as the feeding movement of the stock; and the entire coordination of the master-control is made in accord with uninterrupted progress of F and G'. Conversely, when the pressure in system 13 increases (as upon completion of the fabricating operation by G') then piston SRP is moved to left, overcoming the lower pressure in pipe-system 113 on the left to move arm CA anti-clockwise, reducing the stroke of SP and thereby reducing the pressure supplied by SP to no more than enough to re-charge system 13 including Y up to maximum pressure during the period of rest of F, and to maintain that pressure against oil-leakage, in readiness for the next succeeding initiation by cam X of the cycle of F and G'.

Safety-valve SV1 is constructed to be opened by a pressure in excess of the maximum (as 1000 lbs.) in high-pressure pipe system 13. When SV1 opens then system 13 is relieved by flow of relieving volume of oil via RL1 to the sump or oil-reservoir constituted by the bottom of casing R. This safety-valve operation affords quicker relief than the above change of stroke of the pump which is effective immediately afterwards.

The oil-intake of pump SP is as shown from pipe system 106 which is the return or low-pressure side (thirty pounds) of the system of SP. Foot-valve FV is located between 106 and the oil-sump to prevent escape of oil from 106 at thirty pounds to the sump of zero pressure. If SP needs intake of additional oil to replace leakage from pumps to sump, such oil is drawn from the sump by the suction of the pump which thereupon opens FV. On an average, however, a pressure of about thirty pounds is maintained in suction-pipe 106, thereby increasing the efficiency of pump SP. This maintenance of pressure in 106 is effected by the low pressure from master pump MP by way of manual pressure-adjusting valves PC1 and PC2 in cooperation with valve FV; valve PC1 being connected between the 100 lbs. pressure in pipe-system 113 and the 30 lbs. pressure in pipe-system 106; and valve PC2 being connected in the branch of the pipe system 13 (automatically variable high pressure) which branch opposes in motor VPM the low pressure in pipe-system 113.

Thus manually operated valves PC1 and PC2 constitute the means for pre-setting at desired pressure the maximum pressure attainable by pump SP in high-pressure system 13, Y, 104, 105, said valves being adjustable and calibrated and both being set alike to the same pressure by hand, and making it possible to attain any maximum from 300 lbs. to 1000 lbs. per square inch in said high-pressure system. Valve PC1 permits obtaining the desired maximum pressure in system 13 and valve PC2 prevents such optimum pressure from being exceeded by too abrupt increase of pressure-delivery from pump SP. In the manufacture of the entire machine of Fig. 1, (i. e., in the operation thereof for permanent calibration of master throttle 15) these valves PC1 and PC2 are adjusted to permit securing the desired optimum pressure to cooperate with accumulator Y in operating the fabricating tool for any particular class of work. The operation of this pressure-fixing means is as follows. The sizes of the cylinders of MM1 and VPM are constant, so that by varying the pressure in MM1, (by PC1 located between the 100 lbs. in 113 and the 30 lbs. in 106) the pressure is varied which is required in VPM to overcome MM1 and move CA anti-clockwise to neutral to reduce the stroke of SP. Thus the desired maximum pressure in 13 attainable by SP is determined by the above adjustment of the low pressure relief-valve PC1. Thereafter slave pump SP will maintain the adjusted pressure on F during the time when the fabricating tool thereof (as G') is acting on stock Z, particularly in cooperation with accumulator Y; that is, at that critical stage of operation on Z the tendency of the pressure in Y to become exhausted is countered by the above mechanism so that there is a power tolerance for the full desired effect of the fabricating tool on the stock. The peak relief valve PC2, located in high-pressure line 13, has for its special duty that of limiting the maximum pressure in system 13 and preventing development of excessive peak pressure which might occur if there were insufficient power behind tool G' to permit its desired action on stock Z, as in case G' should stall and cause the pump-pressure of SP to build up abruptly. While it is desirable to have such insurance as PC2 against mishap, yet the provision of accumulator Y makes the occurrence of such peak pressures extremely unlikely.

Master pump MP is driven by main driver K via sheave 11 and slave pump SP via two intermeshing spiral gears (not shown) on the respective spindles of the two pumps, which spindles are at right angles to one another. Thus MP is driven indirectly by common motor K and is coordinated with and controlled by the rate of operation of the stock-feeding means C and E which also are driven by the same power source K, so that the calibration of master-throttle 15 may be adapted to time the frequency of operation of cam X in accord with a predetermined length of stock Z fed by C or E for cutting or other fabrication.

As shown in Fig. 30, master pump MP intakes directly from the oil sump in the bottom of casing R into which all oil-leakage from both pumps MP and SP collects. For pressure-relief of MP, safety valve SV2 is located near an end of low pressure-pipe-system 113 and is set to operate at a pressure slightly in excess of 100 lbs. and then the system is relieved by flow of oil from 113 to the oil-sump in R via RL2.

Master throttle 15 is connected in series in the high-pressure side (100 lbs.) of the low-pressure master pump MP. Oil at 100 lbs. (approximately, dependent upon setting of PC1) always fills pipe system 113 between relief valve SV2 inside casing R, on one hand, and piston VP2 of master valve 112 outside casing R on the other hand. The return from valve 112 is by gravity thru pipe 114 to the oil-sump in R, the oil then not being under pressure as distinguished from the return from slave valve 12, i. e., pipe 106, where the pressure is at about thirty pounds.

From master valve 112 extend the pipes 115—116 to the opposite sides of piston V' in master motor W. Pipes 115—116 always are full of oil, serving as liquid but rigid mechanical connections between valve 112 and motor W in readiness to be clutched to the pressure-oil from pump MP by valve 112 when the latter is operated to connect either 115 or 116 to pressure-line 113.

The advantages of the above hydraulic drive for such intermittently reciprocable machine parts as F are sufficiently clear from the above full and detailed description, altho it may be noted that it dispenses, for use with F, with expensive and complicated solid gearing, and with any clutch composed entirely of solid parts; and that the hydraulic power-connection with F is admirably adapted to operate it because of the uniformity and promptness of action, and the quick reversal without shock, which are provided by the substantial incompressibility of the oil, such incompressibility being necessary as a practical matter in any fluid connection as a substitute for a solid connection in such combination as here (continuous stock-feed and intermittent fabricating device) where the demand for accuracy in spacing between successive fabricated portions of the stock is such as to make it impracticable to employ substantially compressible fluids, i. e., gases such as air or the like, as the sole driving connection. This oil drive provides not only uniformity of frequency of excursions of F but also during the successive excursions it provides a duration of time, uniform for all excursions, between the rest position of F and its immediately succeeding fabricating position. And the clutching of the oil-drive to fabricating load is less liable to injure the apparatus than in the case of a mechanical clutch intermittently connecting the load to the driving means.

The hydraulic drive of F by the automatically variable pressure apparatus in casing R is particularly advantageous in that it adapts the operating pressure to the eccentricities of the power demands of F and G' in a perfect and stepless manner impracticable of accomplishment by either solid or compressible fluid power connections; and the combination of the hydraulic drive with F and with accumulator Y is advantageous in that Y when used provides adequate pressure for the peaks of the curiously varying loads on F, all in addition to the flexibility of operations by the variable-pressure apparatus in casing R. Furthermore, altho the oil is substantially incompressible, yet the arrangement in combination with F permits a useful cushioning effect both at the end of the forward stroke of F and at the end of the return stroke when F finishes its cycle preliminary to its relatively long period of rest. No maintenance of this oil drive, beyond changing the oil occasionally is needed thruout years of constant service. The efficiency of the oil-pumps is 95%, and power is consumed only in proportion to useful work done. By this oil-drive less power is needed than for solid gearing.

The invention may be embodied in various modifications and its scope is to be measured substantially in accord with the claims. A few of the various permissive modifications are noted below.

It is not necessary that either of the oil-driven motors (master W and slave S) shall be reciprocatory devices, for either may be a rotary oil-motor arranged to do the same work as shown, i. e., to operate valve 112 to initiate intermittent excursions of F at times dependent on the stock feed, and to conduct fabricating operations of F which are uniform spacially but which vary in time intervals concurrently with variation of stock-feed. In such arrangement there may be ordinary crank connections between F or cam-carrier 103 and their respective motors S and W.

Also, even when motor S is of the reciprocatory type as shown, the relative functions of cylinder S and piston T may be reversed; that is, instead of the cylinder S being rigidly secured to the bed of the machine and the piston T being connected to drive shear F, all as above, the piston can be secured in fixed relation to the machine as a whole, and the cylinder be left movable and connected to drive shear F, in such case the fixed piston having a tubular form containing passages permitting passage of oil pressure to opposite sides.

Also, within the present invention, the operation of the fabricating tool (as G') may be effected hydraulically as by a piston in an auxiliary cylinder mounted vertically on the fabricating mechanism (as F) the oil-pressure being furnished to such cylinder and piston by way of a flexible pipe from a suitable source of such pressure such as above described; the control of such oil-pressure and piston being suitable and in accord with the above general disclosure but adapted specifically to the special nature of the work to be done on the long stock.

The example disclosed may be modified further as follows. While the arrangement shown which includes oil-motor W and throttle 15 constitutes a most satisfactory form of the invention, yet the intermittent operation of cam X coordinated with the stock-feeding means can be effected by other means than an oil-motor, such as any means having a uniform time of cyclic operation coordinated with the stock-feeding means or controlled by the movement of the stock by the feeding means, and thereby capable of accurately spacing the times of supplying oil-pressure to F, or otherwise initiating the cyclic operation of F while maintaining the rate of actual movement of F (in the direction of the stock-feed at the instant of the shearing operation) the same as the rate of movement of the stock.

Also, various features of the invention involved with the operation of the "flying shear" F may be employed with some "flying" fabricating device which may have some other function than to shear the stock, such as a punching operation or cutting by a circular saw, etc., etc.; and a plurality of different fabricating operations may be performed on successive portions of the stock by a plurality of any such flying elements, each reciprocated and controlled substantially as is shown herein; and in such case a shearing element may or may not be included, but if a shearing operation be included it will be usually the last operation or the other fabricating operations may be simultaneous with that of the shear and with those of one another and all operated and controlled by the same hydraulic system as that herein disclosed, permissively including a slave motor S operating all the fabricating devices simultaneously; or if separate hydraulic devices be used for each fabricating device, the plurality of hydraulic devices may be controlled by the same calibrated master throttle 15 or by target action as above, all in accord with the general principles of this invention.

Furthermore, it is not essential to employ a type of oil-pump requiring reversing valves 12 or 112 or to employ such valves, for pumps may be used wherein the direction of oil-pressure can be reversed in pipes 13 and 106, and such pumps can be controlled according to the present invention, by means of the permanently-fixed and automatically actuated cams and the connections substantially as above described. And even if valves 12 or 112 be employed, with pumps as disclosed, it is not essential that standard or special motors S or W be employed, i. e., motors separate from F and cam-carrier 103 respectively,—for the motor design may be made specially as a part of F or 103, the desideratum being, in connection with intermittently operating mechanism F and a master initiating its excursions, that the oil-pressure as in 13 be promptly clutched to the static oil which stands by as in 104—105 to transmit the pressure to the member as F desired to be intermittently operated.

The above mentioned coordination between the feeding and fabricating mechanisms, including the calibration of master throttle 15 or equivalent master control of F, is effected once for all as a final step in completing each machine as a whole. The general design of the machine is made suitable for a general class of service (such as the straightening and shearing machine disclosed by way of example); and cams U and U' or their equivalents are adjusted to and fixed permanently in the positions proper to effect the desired permanent spacial excursion of F. Then master motor W or an equivalent control for initiating oil-pressure on F at rest, is selected or designed for successive operations as of cam X after time intervals generally corresponding with the order of magnitude of time intervals between fabricating operations within a general range of rates of stock-feed; and the permanent placing of cam X (and of cam X' if a master motor instead of the van of the stock is used to operate cam X as a target) may be in such positions as to cooperate with said objects in selecting or designing the general range of adjustment of the master control. Then the entire machine, in process of manufacture and in operative condition save for calibration of master 15, is operated on a sample of stock Z, as a final step in its construction; and during such operation the throttle 15 is adjusted until the machine produces cut sub-lengths of stock of given uniform lengths, say ten feet. The throttle dial then in that position of adjustment is marked for ten feet. Such operations then are repeated for all the different lengths desired to be cut and within the range of the machine, and the corresponding positions of 15 marked on its dial. The same applies in the alternative case of a target operated by the van end of the stock, i. e., the target is adjustably mounted to be set in any one of a plurality of positions each indicated by a mark of the calibration. Thereafter the oil-system insures accurately spaced fabricating operations.

The operation of the fabricating tool (as die G') does not occur instantly upon the initiation of the excursion of F; after the latter a brief time elapses during which F moves from rest and carries tool G' to its fabricating position above the stock, and during which brief time the portion of stock Z to be fabricated continues to move toward the position where G' is to go down on the proper portion of the stock, so that the feeding movement of the stock which continues uninterruptedly after one fabricating operation (Fig. 20) and thruout the relatively long period of rest of F, continues also for a substantial if brief time interval after F has started to move, no matter how promptly the oil-pressure of static oil in 13 is clutched to the no-pressure static oil in 104. But the positive and definite action of the automatically variable pressure from the oil-apparatus in casing R is such that the action of F and G' is absolutely uniform in successive cycles, the machine being independent of the more or less erratic action of an all-solid clutch; this being the fact no matter what the cycle-frequency of F may be as determined by the adjustment of throttle 15.

Similarly, in providing for the initiation of excursions of F by the van of the stock in lieu of throttle 15 or the like, the setting of the "target" operated by the stock, is made and calibrated in accord with actual performances of the machine and regardless of variation in stock-feed, but coordinated therewith permanently by the calibration, so that no adjustment of the target apparatus is needed save for the purpose of obtaining a different predetermination of the linear dimensions of the uniformly separated fabricated portions of the stock.

I particularly point out and distinctly claim the part, improvement, or combination which I claim as my invention or discovery, as follows:—

1. In a machine for fabricating long stock during feeding movement, the combination with a stationary frame, of means feeding the stock lengthwise; fabricating mechanism mounted on said frame and movable lengthwise of the moving stock; driving means mounted on said frame and operating said fabricating mechanism in accord with the feeding movement of the stock; said fabricating mechanism including and carrying a fabricating tool movable in directions to and from the stock; and connections between the fabricating mechanism and the stationary frame and causing said movements of said tool by the power of the movement of the fabricating mechanism lengthwise of the moving stock.

2. In a machine for fabricating long stock during feeding movement thereof at portions of the stock uniformly spaced apart lengthwise by desired distances, the combination with continuously operating means feeding the stock lengthwise, of normally stationary mechanism movable lengthwise of the moving stock and executing a fabricating operation thereon during the movements of both; and driving means effecting spacially uniform intermittent cycles of movements of said fabricating mechanism at a rate in accord with the feeding movement of the stock and from a substantially invariable position of rest of the fabricating mechanism and at times which are in accord with the feed of the stock.

3. In a machine for fabricating long stock during feeding movement thereof at portions of the stock uniformly spaced apart lengthwise by desired distances, the combination with continuously operating means feeding the stock lengthwise, of mechanism movable lengthwise of the moving stock and carrying a tool movable toward the stock and executing a fabricating operation thereon during the movements of both the stock and said mechanism; means driving the fabricating mechanism lengthwise of the stock at a rate in accord with the rate of stock feed and effecting such drives intermittently at times which are separated uniformly but the intervals between which times are in accord with the stock-feed; and means causing movement of said tool toward the stock during a portion of the movement of the fabricating mechanism as a whole; the travel of said fabricating mechanism being spacially uniform at all times and the fabricating operations being effected on uniformly spaced portions of the stock due to said coordination of the driving means with the stock-feed.

4. In a machine for fabricating long stock during feeding movement thereof at portions of the stock uniformly spaced apart lengthwise by desired distances, the combination with means feeding the stock lengthwise; of a fabricating mechanism movable lengthwise of the moving stock; means driving said fabricating mechanism in accord with the movement of the stock; said fabricating mechanism including and carrying a tool movable in directions to and from the stock; mechanism causing said movements of said tool by the power of the movement of the fabricating mechanism lengthwise of the stock, said tool-operating mechanism including connections between the fabricating mechanism and a stationary portion of the machine; and means causing operation of the fabricating mechanism by said driving means at times in accord with the stock-feed.

5. In a machine for fabricating long stock during feeding movement thereof at portions of the stock uniformly spaced apart lengthwise by desired distances, the combination with continuously operating means feeding the stock lengthwise, of fabricating mechanism movable forward with the moving stock for fabrication thereof and thereafter movable back to starting position as a position of rest; said fabricating mechanism including and carrying a tool movable to act on the stock by the forward movement of the fabricating mechanism after the forward travel of the fabricating mechanism over a definite distance from its position of rest; a slave effecting the complete excursion of said fabricating mechanism, said slave moving the fabricating mechanism at substantially the same rate as the moving stock during the fabricating operation by said tool; means causing movement of said tool toward the stock while the fabricating mechanism as a whole is moving at said rate; and a master initiating successive excursions of the fabricating mechanism by way of the slave after successive periods of rest of the fabricating mechanism; the master as to the time intervals between its successive initiating operations being arranged to operate in accord with the rate of feed of the stock.

6. In a machine for fabricating long stock during feeding movement thereof at portions uniformly spaced lengthwise by desired distances, the combination with continously operating means for feeding the stock lengthwise, of normally stationary fabricating mechanism movable lengthwise of the moving stock; a slave effecting successively uniform excursions of the fabricating device between successive periods of rest thereof and at a rate of movement in accord with the feeding movement of the stock; a master initiating operations of the fabricating mechanism by the slave after the successive periods of rest of the fabricating mechanism; and a constant-speed common driver driving both the slave and the feeding means; the master being arranged to effect such initiation in accord with the feed, predetermining the times of successive operations on the stock by the fabricating mechanism in accord with the stock-feed.

7. In a machine for fabricating long stock during feeding movement thereof at portions uniformly spaced lengthwise by desired distances, the combination with continuously operating means feeding the stock lengthwise, of normally stationary fabricating mechanism movable lengthwise of the moving stock; a slave effecting successively uniform excursions of the fabricating mechanism from a uniform position of rest and at a rate of movement in accord with the feeding movement of the stock; and a master initiating operations of the fabricating mechanism by the slave after the successive periods of rest of the fabricating mechanism; said master being arranged to effect such initiation in accord with the stock feed, predetermining the times of rest and fabricating operations of the fabricating mechanism in accord with the stock-feed.

8. In a machine for fabricating long stock during feeding movement thereof at portions uniformly spaced lengthwise by desired distances, the combination with continuously operating means for feeding the stock lengthwise, of normally stationary fabricating mechanism movable lengthwise of the moving stock; a slave effecting uniform successive excursions of the fabricating mechanism from the same position of rest and at a rate of movement in accord with the feeding movement of the stock; a master initiating operations of the fabricating mechanism by the slave after successive periods of rest of the fabricating mechanism; and a common driver driving both the slave and the feeding means; the master being arranged to effect such initiation intermittently at times in accord with the stock-feed predetermining the times of successive operations by the fabricating mechanism on the stock in accord with the stock-feed.

9. In a machine for fabricating long stock during feeding movement thereof at portions uniformly spaced lengthwise by desired distances, the combination with continuously operating means for feeding the stock lengthwise; of normally stationary fabricating mechanism movable lengthwise of the moving stock; a slave effecting uniform excursions of the fabricating mechanism between successive periods of rest thereof and at a rate of movement in accord with the feeding movement of the stock; and a master initiating successive operations of the fabricating mechanism by the slave after the successive periods of rest of the fabricating mechanism; the master being arranged to effect such initiation intermittently at times in accord with the stock feed, predetermining the intervals of time between successive operations by the fabricating mechanism on the stock in accord with the stock-feed.

10. In a machine for fabricating long stock during feeding movement thereof at portions uniformly spaced lengthwise by desired distances, the combination with continuously operating means feeding the stock lengthwise, of normally stationary fabricating mechanism movable lengthwise of the moving stock; a slave effecting uniform excursions of the fabricating mechanism between successive periods of rest thereof and at a rate of movement in accord with the feeding movement of the stock; and a master initiating successive operations of the fabricating mechanism by the slave after the successive periods of rest of the fabricating mechanism, said master being arranged to effect such initiation intermittently at times in accord with the stock-feed; and a common driver operating said feeding means and slave; said master being manually adjustable to effect said initiation at times causing timing of the fabricating operations on desirably spaced portions of the stock.

11. In a machine for fabricating long stock at portions uniformly spaced lengthwise by desired distances, the combination with means for feeding such long stock lengthwise, of fabricating mechanism for acting on the long stock at uniformly spaced portions of the length thereof; an hydraulic slave effecting excursions of such fabricating mechanism at a rate, of frequency in accord with the stock-feed; and a master effecting successive operations of the fabricating mechanism by the slave at times in accord with the stock-feed.

12. In a machine for fabricating long stock at portions uniformly spaced lengthwise by desired distances, the combination with means feeding such long stock lengthwise, of fabricating mechanism for acting on the long stock at uniformly spaced portions of the length thereof; and an hydraulic drive effecting excursions of the fabricating mechanism at times in accord with the stock feed, thereby predetermining the intervals of time between successive operations by the fabricating mechanism on the stock in accord with the rate of stock-feed.

13. In a machine for fabricating long stock at portions uniformly spaced lengthwise by desired distances, the combination with continuously operating means feeding the stock lengthwise, of normally stationary fabricating mechanism for acting on the long stock at uniformly spaced portions of the length thereof; a slave combined with the fabricating mechanism and effecting successive excursions thereof from its normal position of rest at a rate of frequency in accord with the stock-feed; means initiating successive excursions of the fabricating mechanism by the slave; an hydraulic master operating said initiating means to end the period of rest of the fabricating mechanism; and manually operable means causing the hydraulic master to operate said initiating means automatically at desired times in accord with the stock-feed, said manual means being calibrated for such purpose.

14. In a machine for fabricating long stock at portions uniformly spaced lengthwise by desired distances, the combination with continuously operating means feeding the stock lengthwise, of normally stationary fabricating mechanism movable lengthwise of the moving stock, said mechanism including a fabricating tool movable to and from the stock; an hydraulic slave effecting successive excursions of the fabricating mechanism at a rate of movement in accord with the feeding movement of the stock; means causing movement of said fabricating tool toward the stock during a portion of said excursion of the fabricating mechanism as a whole; a master initiating said excursions of the fabricating mechanism by the hydraulic slave; manually operable means causing said master to initiate said excursions automatically at desired times in accord with the stock-feed.

15. In a machine for fabricating long stock during feeding movement thereof at portions of the stock uniformly spaced apart lengthwise by desired distances, the combination with a frame, of continuously operating means mounted on the frame and feeding the stock lengthwise; normally stationary fabricating mechanism carried by the frame and movable lengthwise of the moving stock; said mechanism including a fabricating tool movable to and from the stock; means carried by the frame and containing a liquid normally not under pressure and static while said mechanism is in position of rest, but in position to be moved to move the fabricating mechanism from its position of rest; an hydraulic clutch connecting said static liquid to liquid under pressure moving the fabricating mechanism as a whole from its position of rest; a master intermittently operating said hydraulic clutch at times in accord with the stock-feed; and mechanism mounted on the frame and connected to said fabricating tool causing fabricating movement of the latter by the forward stroke of the fabricating mechanism as a whole.

16. In a machine for fabricating long stock during feeding movement thereof at portions of the stock uniformly spaced apart lengthwise by desired distances, the combination with a frame, continuously operating means mounted on the frame and feeding the stock lengthwise; normally stationary fabricating mechanism carried by the frame and movable lengthwise of the moving stock; means carried by the frame and containing a liquid in position to be moved to cause excursions of said mechanism; driving means putting pressure on said liquid to operate said fabricating mechanism at a rate in accord with the feeding movement of the stock; and a master intermittently at times which are in accord with the stock-feed causing said driving means to put said pressure on said liquid and initiate excursions of said fabricating mechanism from its position of rest.

17. In a machine for fabricating long stock during feeding movement thereof at portions of the stock uniformly spaced apart lengthwise by desired distances, the combination with continuously operating means feeding the stock lengthwise, of normally stationary fabricating mechanism movable lengthwise of the moving stock; means containing a liquid in position to be moved to move said fabricating mechanism from its normal position of rest; driving means putting pressure on said liquid to operate said fabricating mechanism at a rate in accord with the feeding movement of the stock; and a master intermittently at times which are in accord with the stock-feed causing said driving means to put said pressure on said liquid and initiate excursions of the fabricating mechanism from its position of rest.

18. In a machine for fabricating long stock during feeding movement thereof at portions of the stock uniformly spaced apart lengthwise by desired distances, the combination with means feeding the stock lengthwise, of fabricating mechanism movable lengthwise of the moving stock; means containing a liquid in position to be moved to cause excursions of said mechanism; driving means putting pressure on said liquid to operate said fabricating mechanism at a rate in accord with the stock feed; a master at times which are in accord with the stock feed causing said driving means to put said pressure on said liquid and cause the movement of said fabricating mechanism to be in accord with the stock-feed; and means controlled by the operation of said driving means causing the latter to return the fabricating mechanism in the opposite direction.

19. In a machine for fabricating long stock at portions thereof uniformly spaced apart lengthwise by desired distances, the combination with a frame, of continuously operating means feeding the stock lengthwise, normally stationary fabricating mechanism; an hydraulic slave mounted on said frame and effecting excursions of said fabricating mechanism at a rate of frequency in accord with the stock feed; means containing a liquid under pressure; an hydraulic clutch between the liquid under pressure and the hydraulic slave; and a master operating the hydraulic clutch intermittently at times in accord with the stock-feed.

20. In a machine for fabricating long stock at portions of the stock uniformly spaced apart lengthwise by desired distances, the combination with continuously operating means feeding the stock lengthwise, of normally stationary fabricating mechanism; means containing a liquid in position to be moved to cause excursions of said fabricating mechanism; a variable pressure hydraulic pumping apparatus; an hydraulic clutch between the pumping apparatus and said liquid-containing means; and a master operating the hydraulic clutch intermittently at times which are in accord with the stock-feed.

21. In a machine for fabricating long stock at portions of the stock uniformly spaced apart lengthwise by desired distances, the combination with continuously operating means feeding the stock lengthwise, of normally stationary fabricating mechanism; means containing a liquid in position to be moved to cause excursions of said fabricating mechanism; an hydraulic pump; a pressure-accumulator operated by said pump during the period of rest of said fabricating mechanism; an hydraulic clutch between said pump and accumulator on the one hand and on the other said liquid-containing means; and a master operating said clutch intermittently at times which are in accord with the stock feed and causing the movement of the fabricating mechanism jointly by the pump and the accumulator.

22. In a machine for fabricating long stock at portions of the stock uniformly spaced apart lengthwise by desired distances, the combination with means feeding the stock lengthwise; of fabricating mechanism for acting on the long stock at uniformly spaced portions of the length thereof; an hydraulic slave causing excursions of said fabricating mechanism; and a master causing the operation of the fabricating mechanism by said hydraulic slave to be in accord with the stock-feed.

23. In a machine for fabricating long stock at portions of the stock uniformly spaced apart lengthwise by desired distances, the combination with continuously operating means feeding the stock lengthwise, of normally stationary fabricating mechanism for acting on the long stock at uniformly spaced portions of the length thereof; means containing a liquid in position to be moved to cause excursions of said fabricating mechanism; an hydraulic pump; an hydraulic clutch between the pump and said liquid-containing means; and a master operating the hydraulic clutch intermittently at times in accord with the stock-feed.

24. In a machine for fabricating long stock at portions of the stock uniformly spaced apart lengthwise by desired distances, the combination with continuously operating means feeding the stock lengthwise, of normally stationary fabricating mechanism; an hydraulic motor operative to cause excursions of said fabricating mechanism; an hydraulic pump; an hydraulic clutch between the hydraulic pump and hydraulic motor; and a master operating said hydraulic clutch intermittently at times in accord with the stock-feed.

25. In a machine for fabricating long stock at portions of the stock uniformly spaced apart lengthwise by desired distances, the combination with means feeding the stock lengthwise, of fabricating mechanism; hydraulic means causing excursions of said fabricating mechanism; a master causing the excursions of said fabricating mechanism by the hydraulic means to be in accord with the stock-feed; and manually operable means causing said master automatically to effect said operations at desired times in accord with the stock-feed.

26. In a machine for fabricating long stock at portions of the stock uniformly spaced apart lengthwise by desired distances, the combination with continuously operating means feeding the stock lengthwise, of normally stationary fabricating mechanism; an hydraulic slave effecting excursions of said fabricating mechanism; and an hydraulic master initiating the excursions of the fabricating mechanism by said hydraulic slave intermittently at times in accord with the stock-feed.

27. In a machine for fabricating long stock at portions of the stock uniformly spaced apart lengthwise by desired distances, the combination with means feeding the stock lengthwise, of fabricating mechanism for acting on the long stock at uniformly spaced portions of the length thereof; an hydraulic slave effecting excursions of said fabricating mechanism; and a master effecting operation of said hydraulic slave in accord with the stock-feed.

28. In a machine for fabricating long stock at portions of the stock uniformly spaced apart lengthwise by desired distances, the combination with means feeding the stock lengthwise, of fabricating mechanism for acting on the long stock at uniformly spaced portions thereof; an hydraulic slave motor effecting excursions of said fabricating mechanism; an hydraulic slave pump; a slave valve between said hydraulic pump and hydraulic motor; an hydraulic master pump cooperating with said hydraulic slave pump and causing the load of the movements of said fabricating mechanism to vary the pressure-delivery of the slave pump; and a master-control of said slave valve operated by the hydraulic pressure of said master pump in accord with the stock-feed.

29. In a machine for fabricating long stock at portions of the stock uniformly spaced apart lengthwise by desired distances, the combination with continuously operating means feeding the stock lengthwise, of normally stationary fabricating mechanism for acting on the long stock at uniformly spaced portions thereof; a variable-pressure hydraulic slave operative to effect excursions of said fabricating mechanism; an hydraulic master cooperating with said hydraulic slave to tend to counteract the reduction of hydraulic pressure from the slave caused by the load of the fabricating mechanism; and a pressure-accumulator arranged to cooperate with the hydraulic slave in effecting excursions of the fabricating mechanism; said pressure-accumulator being arranged also to accumulate pressure from said hydraulic slave during the period of rest of the fabricating mechanism; said hydraulic master also initiating operation of the fabricating mechanism jointly by said pressure-accumulator and in accord with the stock-feed.

30. In a machine for fabricating long stock at portions thereof uniformly spaced apart lengthwise by desired distances, the combination with continuously operating means feeding the stock lengthwise, of normally stationary fabricating mechanism for acting on the long stock at uniformly spaced portions thereof; an hydraulic slave intermittently effecting excursions of said fabricating mechanism; a pressure-accumulator operated by said hydraulic slave during the periods of rest of the fabricating mechanism; and a master initiating operation of the fabricating mechanism jointly by the hydraulic slave and the pressure accumulator intermittently at times in accord with the stock-feed.

31. In a machine for fabricating long stock at portions of the stock uniformly spaced apart lengthwise by desired distances, the combination with means feeding the stock lengthwise, of normally stationary fabricating mechanism movable lengthwise of the moving stock over a distance short as compared with the distance between fabricated portions of the stock; an hydraulic slave effecting excursions of the fabricating mechanism along the stock; and a master controlling excursions of the fabricating mechanism by the hydraulic slave in accord with the stock-feed.

32. In a machine for fabricating long stock at portions of the stock uniformly spaced apart lengthwise by desired distances, the combination with continuously operating means feeding the stock lengthwise, of normally stationary fabricating mechanism; an hydraulic slave effecting excursions of the fabricating mechanism intermittently; an hydraulic master effecting initiation of successive excursions of the fabricating mechanism by the hydraulic slave; and a control for the master, said control being set in position to effect initiation of the slave by the master intermittently at desired times in accord with the stock-feed.

33. In a machine for fabricating long stock at portions of the stock uniformly spaced apart lengthwise by desired distances, the combination with continuously operating means feeding the stock lengthwise, of normally stationary fabricating mechanism; a variable-delivery hydraulic slave effecting excursions of the fabricating mechanism intermittently; an hydraulic master cooperating with said hydraulic slave causing to tend to counteract the reduction of hydraulic pressure from the slave caused by the load of the fabricating mechanism; said hydraulic master also cooperating with said hydraulic slave to initiate the excursions of the fabricating mechanism effected by the slave; and a control for said hydraulic master, said control being set in position to effect initiation by the master intermittently at desired times in accord with the stock-feed.

34. In a machine for fabricating long stock at portions of the stock uniformly spaced apart lengthwise by desired distances, the combination with continuously operating means feeding the stock lengthwise, of normally stationary fabricating mechanism including a fabricating tool movable to and from the stock; means containing a liquid in normally static condition in readiness to move the fabricating tool from its position of rest; means putting said liquid under pressure; controlling mechanism operating said pressure-means in accord with the stock-feed to move said liquid and fabricating mechanism from their normal static positions; and means for braking the fabricating mechanism, said braking means being connected between the fabricating mechanism and a stationary portion of the machine.

35. In a machine for straightening and shearing long metal stock, the combination with mechanism feeding the stock lengthwise and straightening it, of shearing mechanism reciprocable longitudinally of the moving stock; means containing a liquid in position to be moved to reciprocate the shearing mechanism; means putting said liquid under pressure; controlling mechanism effecting operation of said pressure means in accord with the stock-feed to move the shearing mechanism in one direction of its reciprocation; and means operated by the movement of the shearing mechanism and operating said pressure means to cause return movement of the shearing mechanism.

36. In a machine for fabricating long stock during feeding movement thereof at portions of the stock uniformly spaced apart by desired distances, the combination with means feeding the stock lengthwise, of mechanism movable lengthwise of the moving stock over a distance short as compared with the distance between fabricated portions of the stock, said mechanism executing a fabricating operation thereon during the movement of both; an hydraulic slave coordinated with said stock-feeding means and operating said fabricating mechanism; and a master also coordinated with said stock-feeding means and controlling the operations of said fabricating mechanism by said hydraulic slave in accord with the stock-feed.

37. In a machine for fabricating long stock during feeding movement thereof at portions of the stock uniformly spaced apart by desired distances, the combination with continuously operating means feeding the stock lengthwise, of normally stationary mechanism movable lengthwise of the moving stock and executing a fabricating operation thereon during the movement of both; an hydraulic slave coordinated with said stock-feeding means and operating said fabricating mechanism; a continuously operating master coordinated with said stock-feeding means; and a device operated by said master intermittently after uniform intervals of time and initiating successive operations of said fabricating mechanism.

38. In a machine of the general nature described, including means for feeding and fabricating long steel stock from a heavy roll of such stock, the combination with such means, of a reel-drum normally holding the stock-roll in cooperative relation with said means; a pivoted support for said drum permitting the drum when empty to be swung thru an arc from its normal operative position to a position facilitating the placing of the heavy stock-roll on the drum; and a weight connected to said reel-system in position to counter-balance the weight of the stock-roll and facilitate swinging of the reel to its position cooperating with the stock-feeding and fabricating means.

39. In a machine for straightening and shearing long stock in the form of rods or wires, the combination with feeding mechanism, of straightening mechanism including a rotary flier; mechanism pulling the stock thru the flier; reciprocable shearing mechanism; mechanism operating the shearing mechanism; and mechanism controlling the operation of the shearing mechanism by said operating mechanism in accord with the stock-feed.

40. In a machine for straightening and shearing long stock, the combination with straightening mechanism, of feeding mechanism pushing the stock toward the straightening mechanism; a driver reciprocable shearing mechanism; feeding mechanism continuously pulling the stock from the straightening mechanism and pushing it to the shearing mechanism; apparatus operating the reciprocable shearing mechanism; and a belt conveying power from the driver to the feeding mechanisms, the straightening mechanism and the shearing mechanism.

41. In a machine for straightening long metal stock in the form of rods or wires, the combination with feeding means, of a rotary flier containing a series of dies thru which the stock is forced by the feeding means, said dies being mounted in the flier in positions laterally staggered with respect to one another by distances decrescent in the direction of stock-feed.

42. In a machine for fabricating long stock, the combination with a frame, of feeding means, reciprocable fabricating mechanism slidably mounted on the frame, and hydraulic system reciprocating said fabricating mechanism, said system including a double-acting reciprocating oil-motor mounted on the frame and having its piston-rod connected to the reciprocable fabricating mechanism; a variable-delivery oil-pump delivering oil-pressure always in one direction; an oil-valve supplied with oil-pressure from said pump and supplying oil-pressure alternately to opposite sides of the portion of said motor.

43. In a machine for shearing successive portions of the length of long stock, the combination with a frame, of normally stationary shearing mechanism reciprocable along the frame and including two shearing tools normally alined in series with one another along the stock, one of said tools being movable across the path of movement of the stock; continuously-operating means normally feeding the stock between said tools successively; hydraulic driving means intermittently reciprocating the shearing mechanism from its normal position of rest in line with the movement of the fed stock; and a linkage connected to said movable tool and to the frame and causing shearing movement of the movable tool along the stationary tool out of alinement and back into alinement with the latter by the movement of the fabricating mechanism as a whole from its position of rest.

44. In a machine for straightening long metal stock, the combination with a frame, of means supporting a reel containing a coil of the stock; two rows of rollers facing one another and engaging the stock between them a portion of the stock extending from its coil on the reel; supporting means for one of said rows which is movable to and from the other of said rows; and means positively rotating the rollers in both rows.

45. In a machine for straightening long metal stock, the combination with feeding means, of a hollow rotary flier; a plurality of die-holders adjustably mounted inside said flier; and dies of hexagonal cross-section mounted in said holders.

46. In a machine for straightening long metal stock, the combination with feeding means, of a hollow rotary flier including a plurality of die-holders arranged in series each containing a die of hexagonal cross-section and each formed with a groove to guide the stock from one die to the next.

47. In a machine for straightening long metal stock, the combination with feeding means, of a rotary flier, and a plurality of dies mounted in said flier and each having a hexagonal cross-section and three stock-grooves alternating with seat-faces each of which faces is diametrically opposite one of the stock-grooves.

48. In a machine for straightening long metal stock, the combination with feeding means, of a rotary flier, a plurality of die-holders and a corresponding plurality of dies having a hexagonal cross-section and three stock-grooves, said dies being successively in staggered relation to one another.

49. In a machine for fabricating long stock, the combination with a frame, of feeding means; reciprocable fabricating mechanism including a movable fabricating tool; means mounted on the frame and reciprocating said fabricating mechanism; and a power-amplifying linkage between the frame and said fabricating tool and causing operation of the latter by the reciprocation of the fabricating mechanism as a whole.

50. In a machine for shearing long stock, the combination with feeding means, of reciprocable shearing mechanism; sheared-stock-discharging mechanism including stationary and movable work-guides; reciprocable mechanism for moving the movable work guide; and mechanism and synchronously reciprocating the shearing mechanism and the mechanism for moving the movable work-guide.

51. In a machine for shearing long stock, the combination with feeding means, of shearing mechanism reciprocable lengthwise of the long stock and including a tool movable to and across the stock for shearing; a stock-support extending longitudinally in front of said shearing mechanism for the reception of the stock-van before shearing and supporting of the same during the shearing operation, said support being movable for discharge of the sheared sub-length; and means causing the discharging movement of said support after the shearing operation by the power of the movement of the shearing mechanism lengthwise of the long stock.

52. In a machine for straightening and shearing long metal stock, the combination with feeding mechanism, of reciprocable shearing mechanism; hydraulic pressure means reciprocating the shearing mechanism; an hydraulic pump supplying pressure to said reciprocating means; a second hydraulic pump; means continuously operating said pumps; and mechanism whereby the operation of the second pump increases the pressure-delivery of the first when the pressure in said reciprocating means is decreased by the load of the shearing mechanism.

53. In a machine for straightening and shearing long metal stock, the combination with feeding-means, of reciprocable shearing mechanism; hydraulic pressure means reciprocating said shearing means; an hydraulic pump having a high pressure connection to said reciprocating means and a connection of lower pressure therefrom returning to the pump; means operative to change the pressure-delivering operation of said pump; a second hydraulic pump; and means connected with the pressure delivery of said second pump and also with the high pressure connection of the first pump, said means operating said pressure-changing means.

54. In a machine for fabricating long metal stock, the combination with a frame, of continuously operating feeding mechanism, reciprocable fabricating mechanism, means intermittently reciprocating said fabricating mechanism; a fabricating tool movably mounted as a part of said fabricating mechanism; and operating connections including braking means connected between said movable tool and said frame.

55. In a machine for shearing long coiled metal stock into sub-lengths, the combination with a freely rotatable reel for the coiled stock, of a frame, a plurality of pairs of stock-feeding rolls arranged in an upper portion of the frame and adjacent the reel in staggered relation to one another and with their axes parallel to the axis of the reel; means positively driving said feeding rolls and located at a lower level than the rolls themselves but tensioning stock between the reel and the first pair of rolls and thereby rotating the reel; stock-shearing means; additional means feeding the stock thru said shearing means; and means supplying additional stock-rolls for supplying said feed rolls upon completion of shearing of previous rolls into sub-lengths, said means including a reel-support in which the reel is freely rotatable, said support itself being movably mounted alongside said driving means and substantially below said feeding rolls but substantially above the bottom of said frame, said movable mounting of the reel support providing for its movement thru an arc which causes the support to move the reel from a loading position at the level of the bottom portion of the frame to its operative position alongside said feeding-rolls at the upper portion of the frame above the level of the roll-driving mechanism.

56. In a machine for feeding and fabricating long metal stock, the combination with a frame, of continuously operating feeding means mounted in the upper part of the frame; fabricating means also mounted in the upper part of the frame; an hydraulic system mounted in the lower part of the frame beneath the feeding and/or fabricating means and intermittently operating the latter.

57. In a machine for straightening long metal stock, the combination with straightening means, of a plurality of alternatively operating devices gripping the stock and pulling it thru the straightening means.

58. In a machine for straightening long metal stock, the combination with straightening means, of a plurality of devices gripping the stock and pulling it thru the straightening means; and mechanism alternately operating said pulling devices and including means effecting quick return of each device to its gripping position before the other device is released from its gripping position.

59. In a machine for straightening long stock in rod or wire form, the combination with feeding means, of a rotary flier, a plurality of die-holders mounted in said flier and including two parts hinged together; and dies in the respective holders and formed with grooves for the stock.

60. In a machine for feeding and fabricating long metal stock, the combination with a frame, of fabricating mechanism mounted thereon; two rows of rollers on the opposite sides of the stock and engaging the latter; spindles for one row of said rollers vertically mounted in fixed positions; horizontally movable supports; spindles for the other row of rollers vertically mounted in said movable supports; means rotating all said spindles; and horizontal shafts journaled in the frame and permitting operator's adjustment of said movable roller-spindle supports.

61. In a machine for shearing stock into sub-lengths, the combination with a freely rotatable reel for the coiled stock, of a frame, feeding rolls mounted in the upper portion of the frame adjacent the reel with their axes paralleling the axis of the reel; driving means for said rolls; shearing means supplied with stock drawn from the reel by the rotation of said rolls by said driving means; and means supplying stock-coils to the reel and including a movable support for the freely rotatable reel, said support extending vertically downward from the operating position of the reel adjacent said feeding rolls, stationary means in which said reel-support is mounted for swinging movement of the reel support which moves the reel away from said feeding-rolls, and a counter-balance for the reel and a stock-coil thereon, carried by the reel-support on the opposite side of the reel-support mounting; the reel support being movable on its said mounting from its operative vertical position to a horizontal position, and said opposing counter-balance being movable into corresponding positions by reason of its said mounting relative to the movable mounting of the reel-support.

62. In a machine for feeding and fabricating long metal stock, the combination with fabricating mechanism, of stock-feeding mechanism including at least two stock-pullers parrot-jawed to grip the van of the stock; mechanism causing grip of the plural pullers successively with the stock; screw-operated means operating the pullers to pull the gripped stock forward; means synchronously disengaging the stock-pullers from the stock and from said screw-operated means; and means effecting quick return of the pullers to their stock-gripping positions.

63. In a machine for shearing lengths from long metal stock, the combination with continuously operating feeding mechanism, of reciprocable shearing mechanism including a normally stationary reciprocable shearing tool; means intermittently reciprocating said shearing mechanism as a whole; and mechanism including a spring carried by the shearing mechanism and tending to hold said tool in position permitting a free path for the fed stock; operating linkage for said tool; a brake retarding operation of said linkage; and quick-acting means restoring the tool to normal position after fabrication thereby.

64. In a machine for feeding and fabricating long metal stock, the combination with feeding and fabricating mechanism, of stock-discharging mechanism including two stock-guides one of which is fixed and the other grooved lengthwise; parallel swinging arms supporting the fixed guide formed to close the grooved portion of the movable guide; and mechanism synchronously operating the movable work-guide and said fabricating mechanism.

65. In a machine for shearing long relatively narrow stock transversely into sub-lengths, the combination with mechanism feeding such stock lengthwise, of two cooperating shearing dies both of which are movable along the length of the stock and the second of which is simultaneously movable across and alongside the other and across the path of the stock to force the stock sub-lengths being sheared from out of the path of stock-feed; mechanism imparting to said dies their said movements including the composite direction of movement of the second die both along the stock and also across the stock during the time of actual shearing; a temporary support for the sub-length prior to and during actual shearing, extending normally in the direction of stock-feed and beyond said movable die; and discharging means intermittently moving said stock-support in the same direction and at substantially the same rate as said compositely movable die while the latter is being moved across the stock to shear off a sub-length.

66. In a machine for shearing long relatively narrow stock transversely into sub-lengths, the combination with mechanism feeding such stock lengthwise, of two cooperating shearing dies, one of which is fixed against movement across the path of the stock and the other of which is movable across and alongside the first and across the stock to force the sub-length being sheared from out of the path of stock-feed, mechanism operating said movable die, a movable temporary stock-support extending normally in the direction of stock-feed and beyond said movable die, receiving the stock from said feeding mechanism and at that time prior to shearing serving as a support for the sub-length of stock to be sheared off by being forced by the movable die from out of the path of stock-feed; and discharging means intermittently moving said stock-support in the same direction and at substantially the same rate as said movable die while the latter is being moved across the stock to force the portion to be sheared out of line with the remaining stock.

67. In a machine for shearing long relatively narrow stock transversely into sub-lengths, the combination with mechanism feeding such stock lengthwise, of two cooperating shearing dies, one of which is fixed against movement across the path of the stock and the second of which is movable across and alongside the other and across the stock to force the sub-length out of the path of stock feed, thereby shearing it; mechanism operating said movable die; and a temporary stock support extending beyond said movable die in the direction of stock-feed and normally in line with said feed close alongside the stock to receive from the feeding mechanism the sub-length of stock to be sheared, said support being movable cooperatively with said movable shearing die in the shearing movement of the latter thereby cooperating with said die by supporting the stock during the shearing movement thereof, the stock-support and the stock moving together with the die as it forces the sub-length out of the path of stock-feed.

68. In a machine for shearing long relatively narrow stock transversely into sub-lengths, the combination with mechanism feeding such stock lengthwise, of two cooperating shearing dies, one of which is fixed against movement across the path of the stock and the second of which is movable across and alongside the other and across the stock to force the sub-lengths to be sheared from out of the path of stock-feed, mechanism operating said movable die; and a temporary support for said sub-length of stock prior to shearing, extending beyond the movable die in the direction of stock-feed and normally receiving the stock from the feeding mechanism, said support including a fixed and a movable member, said movable member being formed with a groove receiving the stock and the fixed member being arranged alongside the normal position of the movable member and cooperating with said grooved movable member in supporting the sublength of stock prior to shearing; said grooved member being movable cooperatively with said movable shearing die in the movement of the latter which forces the sub-length of stock being sheared from out of line with the fed stock whereby said movable supporting member, the stock and the movable shearing die all move together in the direction of die-movement, the stock and movable supporting member are moved beyond the fixed supporting member, and the stock drops by gravity from out of the groove in the movable supporting member.

69. In a machine for shearing long relatively narrow stock transversely into sub-lengths, the combination with mechanism feeding such stock lengthwise, of two cooperating shearing dies, one of which is movable across and alongside the other and across the stock to force a sub-length out of line for shearing, mechanism operating said movable die; a temporary support for the sub-length prior to and during shearing, said support extending normally beyond said dies in the direction of stock-feed and prior to shearing receiving the stock from the feeding mechanism; movable mountings for said support respectively in the vicinity of its fore and aft ends, said support thereby acting as the link connecting said movable mountings; and means moving said support on said mountings during the movement of the movable die which forces the sub-length out of the path of stock-feed.

70. In a machine for shearing relatively long and narrow stock transversely into sub-lengths, the combination with mechanism feeding such stock lengthwise, of two cooperating shearing dies, one of which is movable across and alongside the other and across the stock to shear it; means receiving the successive sub-lengths prior to shearing and supporting each length beneath the movable die in position to be sheared, said means including mechanism moving the supporting means to discharge the sub-length after shearing; and means finally receiving the successively sheared sub-lengths from said initial receiving means and including a receiving member arranged beneath and extending transversely of said initial receiving and supporting means and inclined downwardly away from the latter, and including at its lower portion a stock-retaining member extending up more or less vertically from said inclined receiving member.

71. In a machine for shearing long relatively narrow stock transversely into sub-lengths, the combination with mechanism feeding such stock lengthwise, of two cooperating shearing dies, one of which is movable across and alongside the other and across the stock to shear it; supporting means for said dies; a machine frame on which are mounted said feeding mechanism and die-supporting means; said frame including a tubular member extending horizontally beyond the dies in the direction of stock-feed, and including also a plurality of upright members in which said tubular member is mounted and extending above said tubular member; stock-supporting mechanism movably mounted on upper portions of said upright members and extending horizontally above and parallel with said tubular member beyond said dies in the direction of stock-feed and initially receiving the stock from the feeding mechanism; mechanism automatically moving said supporting mechanism to discharge therefrom the sheared sub-lengths; and means combined with said upright members and finally receiving the sub-lengths discharged from said temporary supporting members.

72. In a machine for straightening long relatively narrow stock and shearing it transversely into sub-lengths, the combination with mechanism preliminarily straightening the stock, of pinch-rolls initially feeding the stock to said straightening means, two co-operating shearing dies one of which is movable alongside the other to force the sub-length to be sheared from out of line with the stock-feed; secondary straightening mechanism; pinch-rolls pulling the stock thru and out of the preliminary straightening mechanism and pushing it into the secondary straightening mechanism; and final feeding mechanism pulling the stock thru and out of the secondary straightening mechanism and pushing it beyond said shearing dies.

73. In a machine for straightening long relative narrow stock and cutting it transversely into sub-lengths, the combination with a plurality of staggered and spaced straightening rolls; of primary stock-pinching feed-rolls pushing the stock toward said straightening rolls; mechanism positively rotating each of said primary pinching rolls; mechanism positively rotating each of said staggered and spaced straightening rolls to undulate and straighten the stock; a tool reciprocable in line with the stock-feed by said pinching rolls and also simultaneously movable transversely to the line of stock-feed; secondary stock-pinching feed-rolls pulling the stock from said straightening rolls and toward said fabricating tool; mechanism positively rotating each of said secondary pinching-rolls; and mechanism reciprocating said tool in line with the stock-feed and in synchronism with said mechanisms operating the feed-rolls, and simultaneously moving the tool transversely to the line of stock-feed.

74. In a machine for straightening long relatively narrow stock and cutting it transversely into sub-lengths, the combination with mechanism feeding the stock continuously at a uniform rate, of stock-straighening mechanism, a clutch, common driving means for the stock-feeding mechanism, the straightening mechanism and the clutch; a tool reciprocating in line with the stock-feed and simultaneously movable also across the stock to shear it; mechanism exclusive of the stock normally disconnected from the clutch and operative between the clutch and the tool and imparting to the latter its said simultaneous movements; and mechanism coordinated with the rate of the moving stock and intermittently connecting the clutch with the tool to impart its simultaneous movements thereto.

75. In a machine for straightening rods and wires, the combination with a roll-frame and a stock-reel arranged adjacent thereto and supporting a stock-roll in horizontal position, vertical shafts rotatably mounted in said roll-frame, pinch-feed rolls fixed to said shafts in a pair adjacent one another in positions to pinch the stock between them; positively-driven spaced and staggered straightening rolls to which the stock is fed by said pinch-rolls, said straightening rolls also having feeding engagement with the stock; and mechanism positively rotating said feed shafts and feed rolls.

76. In a machine for severing long stock transversely into sub-lengths, the combination with stock-feeding mechanism, of a tool reciprocable in line with the stock-feed and simultaneously movable also across the path of feed of the stock to sever it; mechanism operating said tool; a common driver; solid driving connections between the driver and the stock-feeding mechanism; and liquid and solid operating connections successively disposed between the driver and the tool-operating mechanism.

77. In a machine for fabricating long relatively narrow stock at successive points along its length, the combination with a relatively stationary frame, of mechanism feeding the stock continuously lengthwise at a uniform rate; of a fabricating tool; ways mounted on said frame parallel with the line of stock-feed; a primary carrier sliding reciprocably on said ways in line with the stock-feed; a secondary carrier movable rectilinearly in a direction transverse to the line of stock-feed, said tool being mounted in said secondary carrier; an hydraulic motor reciprocating the primary carrier; and a toggle linkage between the frame and the secondary carrier causing reciprocation of the latter by the reciprocation of the primary carrier by the hydraulic motor.

78. In a machine for fabricating long relatively narrow stock at successive points of its length, the combination with a relatively stationary frame, of mechanism feeding the stock lengthwise, of a fabricating tool movable in the direction of stock-feed and also simultaneously movable transversely thereof; a carrier in which said tool is mounted for said transverse movement thereby; an hydraulic motor moving said carrier; a common driver operating said feeding mechanism and said hydraulic motor; and linkage between the frame and the tool causing movement of the tool and its carrier by the movement of the carrier by the hydraulic motor.

79. In a machine for straightening long relatively narrow metal stock, the combination with a frame, of two parallel rows of rollers facing one another to engage opposite sides of the stock to be straightened, the rolls of one row being staggered with respect to the rolls of the other row and the staggered rolls of pairs in the two rows being relatively widely spaced from one another; shafts on which said rolls are mounted; a support in which are mounted the shafts for one row of rolls, said support being fixedly mounted on said frame; a support in which are mounted the shafts for the other row of rolls, said support being mounted on the frame to be moved to and from the fixed support and adjust the spaces between the rolls of the respective supports; mechanism positively rotating the roll-shafts in both supports; and mechanism positively moving said movable roll-support to and from the fixed roll-support.

80. In a machine for straightening long relatively narrow metal stock, the combination with feeding means, of a rotary flier, a series of pairs of self-locking die-holders each containing a replaceable grooved wearing half-die thru which the stock is forced by the feeding mechanism, said pairs of die-holders half-dies being mounted in the flier in positions radially staggered with respect to one another by distances decrescent in the direction of stock-feed; each die-holder including a forked closing member hinged at one end, and a stock-guiding passage formed in its other end; the half-dies being housed and locked in said holders by said hinged members; and clamping screws at diametrically opposite faces of said dies for adjusting the degrees of staggering of the die-holders.

81. In a machine for straightening long metal rods, the combination with a rotary flier, of a plurality of die-holders arranged in pairs facing one another; and a corresponding number of grooved dies in said holders and also facing one another to receive the rod in the passages formed by the two facing grooves; each die comprising a wearing member having an hexagonal cross-section, alternating faces formed with the grooves, and alternating faces for engagement with the die-holder.

82. In a machine for fabricating long stock at uniformly spaced portions of its length, the combination with mechanism feeding the stock longitudinally, of a fabricating tool; a carrier therefor; a member supporting said carrier, the carrier being mounted to move along said supporting member in directions substantially at right angles to the direction of longitudinal stock-feed; a fluid-motor having a piston connected with said carrier thereby causing movement of the carrier carrying the tool into fabricating engagement with the stock upon the operation of the motor-piston; a valve controlling the application of fluid-pressure to said motor-piston; and means operating said valve upon the feed of desired lengths of stock, causing operation of the tool on the stock at uniformly spaced portions of the stock-length, said means including a manually adjustable device determining the lengths of stock between said uniformly spaced fabricated portions.

83. In a machine for shearing long metal stock, during lengthwise feeding thereof, successively into sub-lengths, the combination with shearing means including two shearing tools one of which is movable across and alongside the other for shearing, of continuously operating mechanism feeding the stock to and beyond the shearing means over desired distances before shearing; slave mechanism effecting reciprocation of the shearing means including both said tools along the length of the moving stock; and an hydraulically operating master controlling intermittent initiations of said reciprocations of the shearing means by the slave mechanism at times after feeding of the stock beyond the shearing means which determine the length of stock-portions sheared off.

84. In a machine for fabricating long metal stock at portions thereof uniformly spaced apart by desired distances, the combination with continuously-operating means feeding the stock lengthwise, of normally stationary fabricating mechanism; continuously operating hydraulic means; means operating to accumulate pressure and operated by said hydraulic means during the periods of rest of the fabricating mechanism; and means effecting intermittent movements of the fabricating mechanism along the length of the moving stock by power from both said hydraulic means and pressure-accumulator.

85. In a machine for shearing long relatively narrow and continuously moving metal stock transversely into sub-lengths, the combination with normally stationary shearing means including two cooperating shearing tools of which the first in the direction of stock-feed is formed with a stock-passage surrounding and fitting the stock continuously moving thru it, the second tool in the direction of stock-feed being movable across and alongside the first and across the path of the stock forcing the sub-lengths sheared from out of the path of stock-feed; continuously operated mechanism feeding the stock thru said tool-passage and beyond the second tool to the desired distances before shearing; intermittently operated mechanism operating said shearing means; means extending beyond the second shearing tool in the direction of stock-feed and arranged as a support, before and during shearing, and in cooperation with the first tool, for the stock-portions successively fed beyond the first tool before shearing; said extending supporting means being movable from its supporting position for discharge of the sheared off sublength; and mechanism causing the discharging movement of said supporting means and operated intermittently by power from said intermittently operated parts of the machine.

86. In a machine for shearing long relatively narrow and continuously moving metal stock transversely into sub-lengths, the combination with normally stationary shearing means including two cooperating shearing tools of which the first in the direction of stock-feed is formed with a stock-passage surrounding and fitting the stock continuously moving thru it, the second tool in the direction of stock-feed being movable across and alongside the first and across the path of the stock forcing the sub-lengths sheared from out of the path of stock-feed; continuously operated mechanism feeding the stock thru said tool-passage and beyond the second tool to the desired distances before shearing; intermittently operated mechanism operating said shearing means; means extending beyond the second shearing tool in the direction of stock-feed and arranged as a support, before and during shearing, and in cooperation with the first tool, for the stock-portions successively fed beyond the first tool before shearing; and mechanism operated intermittently by power from said intermittently operated parts of the machine and causing discharge from said supporting means of the sub-lengths of stock successively sheared off.

87. In a machine for shearing long metal stock, during lengthwise feeding thereof, successively into sub-lengths, the combination with shearing means including two normally stationary shearing tools one of which is movable alongside and across the other for shearing, of continuously operating mechanism feeding the stock lengthwise to and beyond said shearing tools; slave mechanism effecting successive complete cycles of operation of said shearing tools including movements of said tools along the line of stock-feed at the same rate as the stock and over distances short relative to the sheared sub-lengths of stock; clutching means causing said relatively short movements of said shearing tools; means controlling the operation of said clutching means; and master-mechanism operating said controlling means, said master-mechanism including an hydraulic motor.

88. In a machine for shearing long metal stock, during lengthwise feeding thereof, successively into sub-lengths, the combination with shearing means including two normally stationary shearing tools one of which is movable alongside and across the other for shearing, of continuously operating mechanism feeding the stock lengthwise to and beyond said shearing tools; slave mechanism effecting successive complete operating cycles of said shearing tools including movements of said tools along the line of stock-feed at the same rate as the stock and over distances short relative to the sheared sub-lengths of stock; clutching means causing correspondingly short movements of said slave mechanism; normally stationary but manually adjustable means controlling the times of successive operations of said clutching means; and an hydraulic master motor controlled by said adjustable controlling means and itself initiating the operation of said clutching means.

89. In a machine for shearing long metal stock, during lengthwise feeding thereof, successively into sub-lengths, the combination with shearing means including two normally stationary shearing tools one of which is movable alongside and across the other for shearing, of continuously operating mechanism feeding the stock lengthwise to and beyond said shearing tools; slave mechanism effecting successive complete operating cycles of said shearing tools including movements of said tools along the line of stock-feed at the same rate as the stock and over distances short relative to the sheared sub-lengths of stock; means controlling the frequency of successive operating engagements of said clutching means, and the durations of said operating engagements; and master-mechanism including an hydraulic motor and operating said controlling means.

90. In a machine for shearing long metal stock, during lengthwise feeding thereof, successively into sub-lengths, the combination with shearing means including two normally stationary shearing tools one of which is movable alongside and across the other for shearing, of continuously operating mechanism feeding the stock lengthwise to and beyond said shearing tools; slave mechanism effecting successive complete operating cycles of said shearing tools including movements of said tools along the line of stock-feed at the same rate as the stock and over distances short relative to the sheared sub-lengths of stock; clutching means causing correspondingly short movements of said slave mechanism; mechanism initiating operation of said clutching means; an hydraulic master motor operating said clutch-initiating mechanism; an hydraulic pump and a sump and a safety valve for the pump; operating-valve means between said pump and motor and operated by the motor; means driving said hydraulic pump in coordination with the rates of said slave mechanism, and stock-feeding mechanism; and means determining the rate of operation of the hydraulic motor by said pump and thereby determining the sheared sublengths of stock, said means being adjustable relative to the rate of operation of the pump and of the stock-feeding mechanism.

91. In a machine for shearing long metal stock, during lengthwise feeding thereof, successively into sub-lengths, the combination with two normally stationary shearing tools one of which is movable alongside and across the other for shearing; of continuously operating mechanism feeding the stock lengthwise to and beyond said shearing tools; means for supporting the van of the stock fed beyond the tools, said means being movable for discharge of the sheared sub-lengths; slave mechanism effecting successive complete operating cycles of said shearing tools on successive stock-vans on said supporting means, and also effecting movements of said supporting means for discharge of sheared sub-lengths; clutching means causing successive operations of said slave mechanism; means controlling the operation of said clutching means; and master mechanism including an hydraulic motor and operating said controlling means.

92. In a machine for shearing successive portions of the length of long stock, the combination with a frame, of normally stationary shearing mechanism reciprocable along the frame and back and forth along the long stock, said mechanism including two shearing tools normally generally alined with one another successively along the long stock, one of said tools being movable across the path of feeding movement of the stock; continuously operating means normally feeding the stock lengthwise between said successively disposed tools, driving means intermittently causing reciprocation of the shearing mechanism from its normal position of rest along the line of the fed stock, said movable tool being combined with the rest of the shearing mechanism in an arrangement maintaining said general alinement of the two tools during the normal stationary condition of the shearing mechanism whereby the initial movement of the shearing mechanism from its state of rest by said driving means causes prompt shearing movement of the movable tool across the stock-path thereby increasing the accuracy of uniformity of sheared sub-lengths; and master mechanism coordinated with the feeding of the stock and automatically controlling the times of intermittent operation of the shearing mechanism by said driving mechanism and including manually adjustable means for varying the frequency of such times and thereby obtaining at will uniform sheared sub-lengths of desired lengths at different times.

JOSEPH H. ROBERTS.